(12) United States Patent
Sikri et al.

(10) Patent No.: US 9,226,213 B2
(45) Date of Patent: Dec. 29, 2015

(54) ENHANCED SLOW ASSOCIATED CONTROL CHANNEL (ESACCH)

(71) Applicant: Qualcomm Incorporated, San Diego, CA (US)

(72) Inventors: Divaydeep Sikri, Farnborough (GB); Hassan Rafique, Farnborough (GB); Cetin Altan, Farnborough (GB); Mungal Singh Dhanda, Slough (GB); Zhi-Zhong Yu, Reading (GB)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 13/726,003

(22) Filed: Dec. 21, 2012

(65) Prior Publication Data

US 2013/0225157 A1 Aug. 29, 2013

Related U.S. Application Data

(60) Provisional application No. 61/602,362, filed on Feb. 23, 2012.

(51) Int. Cl.
*H04W 36/30* (2009.01)
*H04W 24/04* (2009.01)
*H04L 1/00* (2006.01)
*H04L 1/06* (2006.01)
*H04W 36/00* (2009.01)

(52) U.S. Cl.
CPC ............. *H04W 36/30* (2013.01); *H04L 1/0061* (2013.01); *H04L 1/0072* (2013.01); *H04L 1/06* (2013.01); *H04W 24/04* (2013.01); *H04W 36/0055* (2013.01)

(58) Field of Classification Search
CPC .............................. H04W 36/30; H04W 24/04
USPC ........................................................... 455/423
See application file for complete search history.

(56) References Cited

U.S. PATENT DOCUMENTS

| 5,487,071 A | 1/1996 | Nordstrand et al. |
| 6,192,244 B1 | 2/2001 | Abbadessa |
| 7,620,013 B2 | 11/2009 | Zeng et al. |
| 8,046,662 B2 | 10/2011 | Heiman et al. |

(Continued)

FOREIGN PATENT DOCUMENTS

WO 2011141231 A1 11/2011

OTHER PUBLICATIONS

3GPP TS 44.006, "3rd Generation Partnership Project; Technical Specification Group GSM/EDGE Radio Access Network; Mobile Station—Base Station System (MS—BSS) interface; Data Link (DL) layer specification," V10.0.0, Release 10, Mar. 2011, pp. 1-60.

(Continued)

*Primary Examiner* — Jinsong Hu
*Assistant Examiner* — Jean Chang
(74) *Attorney, Agent, or Firm* — Larry J. Moskowitz

(57) ABSTRACT

A method for wireless communication is described. A slow associated control channel block is received. It is determined that the slow associated control channel block fails an integrity check. A correlation level between the slow associated control channel block and one or more stored slow associated control channel blocks is determined. The stored slow associated control channel blocks are set based on a maximum correlation level. Other aspects, embodiments, and features are also claimed and described.

30 Claims, 11 Drawing Sheets

(56) References Cited

U.S. PATENT DOCUMENTS

| | | | |
|---|---|---|---|
| 2005/0175123 A1* | 8/2005 | Gurney et al. | 375/324 |
| 2007/0140164 A1* | 6/2007 | Zeng et al. | 370/329 |
| 2007/0142069 A1* | 6/2007 | Heiman | 455/515 |
| 2009/0201858 A1 | 8/2009 | Riddington et al. | |
| 2010/0008330 A1* | 1/2010 | Zeng et al. | 370/333 |
| 2011/0205947 A1* | 8/2011 | Xin et al. | 370/311 |
| 2013/0059587 A1* | 3/2013 | Lindoff et al. | 455/436 |
| 2013/0064331 A1* | 3/2013 | Das et al. | 375/341 |

OTHER PUBLICATIONS

International Search Report and Written Opinion—PCT/US2013/026470—ISA/EPO—Aug. 2, 2013.

Partial International Search Report—PCT/US2013/026470—ISA/EPO—Jun. 6, 2013.

* cited by examiner

ENHANCED SLOW ASSOCIATED CONTROL CHANNEL (ESACCH)

RELATED APPLICATION AND PRIORITY CLAIM

This application is related to and claims priority from U.S. Provisional Patent Application Ser. No. 61/602,362, filed Feb. 23, 2012, for "ENHANCED SLOW ACCESS CONTROL CHANNEL," which is incorporated herein by reference as if fully set forth below and for all applicable purposes.

TECHNICAL FIELD

Embodiments discussed in this patent application relate generally to communication systems. More specifically, embodiments relate to one or more aspects of systems and methods for enhanced slow associated control channel (eSACCH) for use in a communication system.

BACKGROUND

Wireless communication systems have become an important means by which many people worldwide have come to communicate. A wireless communication system may provide communication for a number of subscriber stations, each of which may be serviced by a base station.

New subscriber stations are continuously being released to the public. These new subscriber stations boast more features and increased reliability. However, older subscriber stations continue to be used by consumers. The older subscriber stations may be referred to as legacy devices.

One major concern for users of subscriber stations is the frequency of dropped calls. Dropped calls reduce the satisfaction rate of wireless communication providers. Benefits may be realized by reducing the frequency of dropped calls for subscriber stations, including legacy devices.

SUMMARY OF SOME EXAMPLE EMBODIMENTS

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Embodiments of the present invention address the above issues as well as others. Indeed, embodiments of the present invention provide power efficient devices, systems, and methods that can alleviate time delays. Doing so can not only utilize power resources efficiently but can aid in minimizing delays associated with network communications.

A method for wireless communication is described. A slow associated control channel block is received. It is determined that the slow associated control channel block fails an integrity check. A correlation level between the slow associated control channel block and one or more stored slow associated control channel blocks is determined. The stored slow associated control channel blocks are set based on a maximum correlation level. Other aspects, embodiments, and features are also claimed and described.

The integrity check may be a cyclic redundancy check. The stored slow associated control channel blocks may have previously passed a cyclic redundancy check. The method may be performed by a wireless communication device. The method may also be performed by a base station.

The stored slow associated control channel blocks may be set by reusing the stored slow associated control channel blocks if the maximum correlation level is above a threshold. Additionally, the stored slow associated control channel blocks may be set by performing a repeated slow associated control channel procedure if the maximum correlation level is below a threshold.

A burst with a highest quality in the slow associated control channel block may be selected. The burst with the highest quality may have a highest estimated signal-to-noise ratio. Each correlation level may be determined between the burst and a portion of a stored slow associated control channel block. The portion of the stored slow associated control channel block may be of the same type as the burst. It may be determined that the portion of the stored slow associated control channel block includes one of system information and measurement information.

A handover may be started. The stored slow associated control channel blocks may be saved into temporary slow associated control channel blocks. The stored slow associated control channel blocks may be flushed. The temporary slow associated control channel blocks may be saved into the stored slow associated control channel blocks upon a handover failure.

A current power control level and a current timing advance may be reused. The current power control level and the current timing advance may be based on a previously received slow associated control channel block that passed a cyclic redundancy check.

An apparatus for wireless communication is also described. The apparatus includes a processor, memory in electronic communication with the processor, and instructions stored in the memory. The instructions are executable by the processor to receive a slow associated control channel block. The instructions are also executable by the processor to determine that the slow associated control channel block fails an integrity check. The instructions are further executable by the processor to determine a correlation level between the slow associated control channel block and each stored slow associated control channel block. The instructions are additionally executable by the processor to set the stored slow associated control channel blocks based on a maximum correlation level.

A wireless device is also described. The wireless device includes means for receiving a slow associated control channel block. The wireless device also includes means for determining that the slow associated control channel block fails an integrity check. The wireless device further includes means for determining a correlation level between the slow associated control channel block and each stored slow associated control channel block. The wireless device additionally includes means for setting the stored slow associated control channel blocks based on a maximum correlation level.

A computer-program product for wireless communications is also described. The computer-program product includes a non-transitory computer-readable medium having instructions thereon. The instructions include code for causing a wireless communication device to receive a slow associated control channel block. The instructions also include code for causing the wireless communication device to determine that the slow associated control channel block fails an integrity check. The instructions further include code for causing the wireless communication device to determine a correlation level between the slow associated control channel block and each stored slow associated control channel block. The instructions additionally include code for causing the wireless communication device to set the stored slow associated control channel blocks based on a maximum correlation level.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments, it should be understood that such exemplary embodiments can be implemented in various devices, systems, and methods.

DETAILED DESCRIPTION

Figure 1:
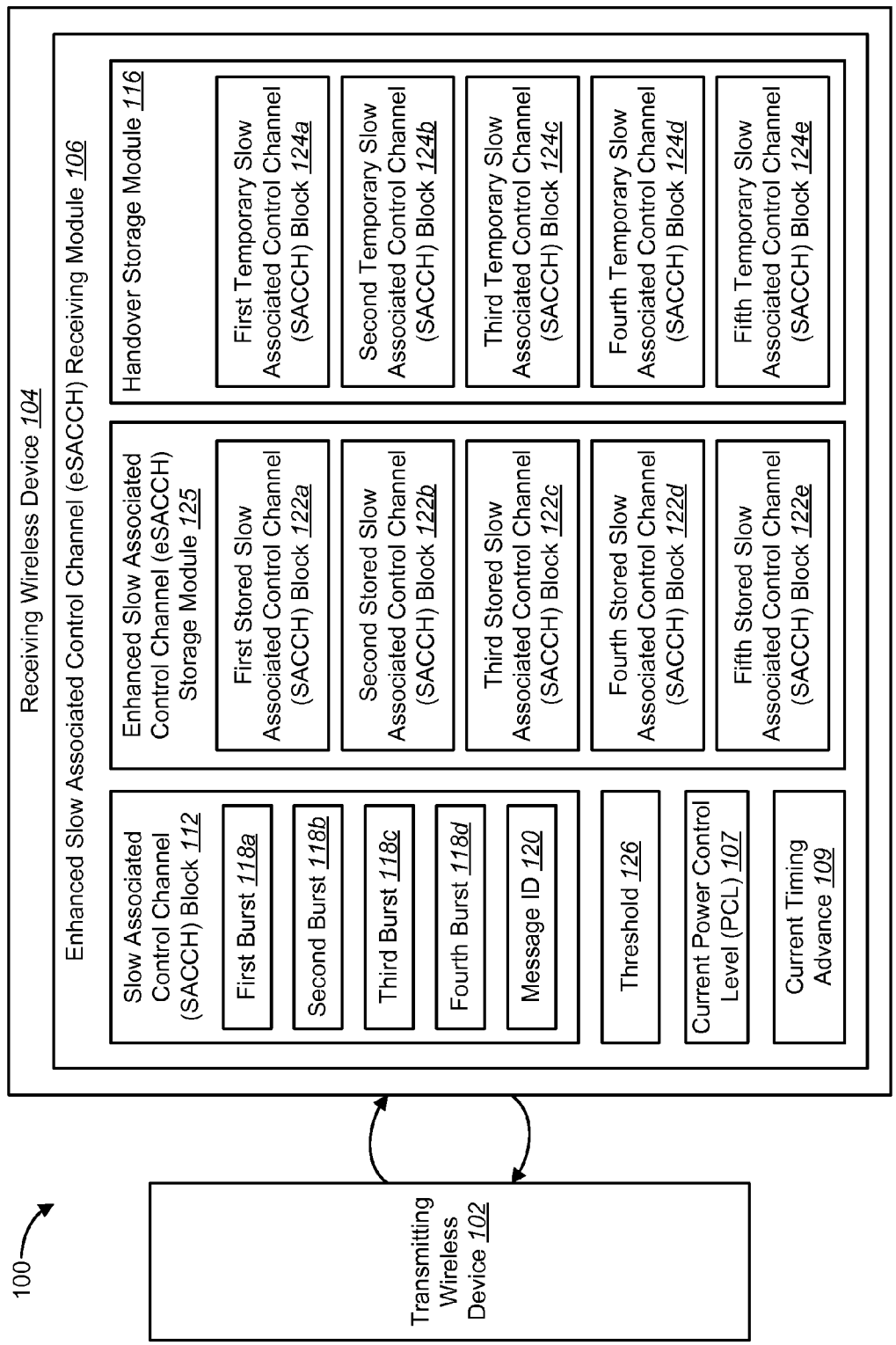
FIG. 1 is a block diagram illustrating a wireless communication system with multiple wireless devices according to embodiments of the present invention.

FIG. 1 is a block diagram illustrating a wireless communication system 100 with multiple wireless devices according to embodiments of the present invention. Wireless communication systems 100 are widely deployed to provide various types of communication content such as voice, data, and so on. In embodiments of the present invention, a wireless device may be a transmitting wireless device 102 or a receiving wireless device 104. In one configuration, the transmitting wireless device 102 may be a base station and the receiving wireless device 104 may be a wireless communication device. In another configuration, the transmitting wireless device 102 may be a wireless communication device and the receiving wireless device 104 may be a base station.

A base station is a station that may communicate with one or more wireless communication devices. A base station may also be referred to as, and may include some, or all, of the functionality of, an access point, a broadcast transmitter, a NodeB, an evolved NodeB, a base transceiver station, etc. The term "base station" will be used herein. Each base station may provide communication coverage for a particular geographic area. A base station may provide communication coverage for one or more wireless communication devices. The term "cell" can refer to a base station and/or its coverage area depending on the context in which the term is used.

Communications in a wireless system (e.g., a multiple-access system) may be achieved through transmissions over a wireless link. Such a communication link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

The wireless communication system 100 may utilize MIMO. A MIMO system may support both time division duplex (TDD) and frequency division duplex (FDD) systems. In a TDD system, uplink and downlink transmissions are on the same frequency region so that the reciprocity principle allows the estimation of the downlink channel from the uplink channel. This enables a transmitting wireless device 102 to extract transmit beamforming gain from communications received by the transmitting wireless device 102.

The wireless communication system 100 may be a multiple-access system capable of supporting communication with multiple wireless communication devices by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, evolution-data optimized (EV-DO), single-carrier frequency division multiple access (SC-FDMA) systems, $3^{rd}$ Generation Partnership Project (3GPP) Long Term Evolution (LTE) systems, and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA, and Low Chip Rate (LCR) while cdma2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and Long Term Evolution (LTE) are described in documents from an organization named "3rd Generation Partnership Project" (3GPP). cdma2000 is described in documents from an organization named "3rd Generation Partnership Project 2" (3GPP2).

The $3^{rd}$ Generation Partnership Project (3GPP) is a collaboration between groups of telecommunications associations that aims to define a globally applicable $3dr$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems, and mobile devices.

In 3GPP Long Term Evolution (LTE), a wireless communication device may be referred to as a "user equipment" (UE). A wireless communication device may also be referred to as, and may include some or all of the functionality of, a terminal, an access terminal, a subscriber unit, a station, etc. A wireless communication device may be a cellular phone, a personal digital assistant (PDA), a wireless device, a wireless modem, a handheld device, a laptop computer, a Session Initiation Protocol (SIP) phone, a wireless local loop (WLL) station, etc.

A wireless communication device may communicate with zero, one or multiple base stations on the downlink and/or uplink at any given moment. The downlink (or forward link) refers to the communication link from a base station to a wireless communication device, and the uplink (or reverse link) refers to the communication link from a wireless communication device to a base station.

The wireless communication system 100 may use a slow associated control channel (SACCH). The slow associated control channel (SACCH) may allow information to be exchanged between the receiving wireless device 104 and the transmitting wireless device 102. The slow associated control channel (SACCH) information is primarily used for control messages, which help maintain the radio link in GSM voice calls in both directions between a transmitting wireless device 102 and a receiving wireless device 104. The slow associated control channel (SACCH) information may be transmitted on a downlink or an uplink. The transmitting wireless device 102 may exchange slow associated control channel (SACCH) information with the receiving wireless device 104 during a voice call by sending a slow associated control channel (SACCH) block 112. For example, the slow associated control channel (SACCH) block 112 may convey system information (SI) and message information (MI). The receiving wireless device 104 may perform an integrity check on the slow associated control channel (SACCH) block 112 to determine whether the slow associated control channel (SACCH) block 112 is corrupt. If the slow associated control channel (SACCH) block 112 fails the integrity check too many times, the call may be dropped.

The receiving wireless device 104 may be equipped to use an advanced slow associated control channel (SACCH) procedure called enhanced slow associated control channel (eSACCH) that may allow the receiving wireless device 104 to remain connected with the transmitting wireless device 102 even when some of the information in the slow associated control channel (SACCH) block 112 is corrupt. The information that may be stored in the slow associated control channel (SACCH) blocks 112 is necessary for the receiving wireless device 104 to continue communications with the transmitting wireless device 102. Although each slow associated control channel (SACCH) block 112 may include these pieces of information, the system information (SI) and message information (MI) sent by a particular transmitting wireless device 102 does not change very often. Therefore, even though the slow associated control channel (SACCH) block 112 may be corrupt, the receiving wireless device 104 may avoid dropped calls or a handover to another transmitting wireless device 102 (and potentially less favorable wireless conditions) by determining whether the received slow associated control channel (SACCH) block 112 that is corrupt is good enough.

A receiving wireless device 104 may receive a slow associated control channel (SACCH) block 112 from a transmitting wireless device 102. The slow associated control channel (SACCH) block 112 may be transmitted periodically or the slow associated control channel (SACCH) block 112 may be transmitted only when necessary. Upon receiving a slow associated control channel (SACCH) block 112, the receiving wireless device 104 may determine whether the slow associated control channel (SACCH) block 112 is corrupt by performing an integrity check. Each time a slow associated control channel (SACCH) block 112 passes the integrity check, a radio link counter may be incremented by two. Each time a slow associated control channel (SACCH) block 112 fails the integrity check, the radio link counter may be decremented by one. The transmitting wireless device 102 may provide the receiving wireless device 104 an initial value of the radio link counter. When the radio link counter reaches 0, a radio link failure may be declared and the connection may be dropped by the receiving wireless device 104. This means that, with the conventional slow associated control channel (SACCH), there may be a radio link failure when the slow associated control channel (SACCH) integrity check fails for more than 66.67% of the received slow associated control channel (SACCH) blocks 112. However, a radio link failure due to a slow associated control channel (SACCH) integrity check may occur well before voice quality becomes an issue, which may lead to premature call drop.

The receiving wireless device 104 may take advantage of the unchanging values of the system information (SI) and the message information (MI) associated with a particular transmitting wireless device 102 that is included in the transmitted slow associated control channel (SACCH) blocks 112. Therefore, even if a received slow associated control channel (SACCH) block 112 is corrupt, the slow associated control channel (SACCH) block 112 may still include enough uncorrupted information to indicate that a particular slow associated control channel (SACCH) setting (e.g., system information (SI) or message information (MI)) has not changed and the radio link counter may not be decremented. For example, the receiving wireless device 104 may maintain a database of previously received slow associated control channel (SACCH) information (i.e., an enhanced slow associated control channel (eSACCH) storage module 125).

The receiving wireless device 104 may compare the currently received slow associated control channel (SACCH) block 112 with the stored slow associated control channel (SACCH) information to determine whether the received slow associated control channel (SACCH) block 112 is close enough to the stored slow associated control channel (SACCH) information. If the corrupt slow associated control channel (SACCH) block 112 information is close enough to the stored slow associated control channel (SACCH) information, the receiving wireless device 104 may assume that the stored slow associated control channel (SACCH) setting has been updated (by the corrupt slow associated control channel (SACCH) block 112 information) and a dropped call/handover may be avoided.

The receiving wireless device 104 may include an enhanced slow associated control channel (eSACCH) receiving module 106 that may perform the enhanced slow associated control channel (eSACCH) procedure to reduce the number of dropped calls and handovers. The enhanced slow associated control channel (eSACCH) receiving module 106 may receive the slow associated control channel (SACCH) block 112 from the transmitting wireless device 102. Upon receiving the slow associated control channel (SACCH) block 112 the enhanced slow associated control channel (eSACCH) receiving module 106 may determine whether the slow associated control channel (SACCH) block 112 fails an integrity check. If the slow associated control channel (SACCH) block 112 fails the integrity check, the enhanced slow associated control channel (eSACCH) receiving module 106 may compare the slow associated control channel (SACCH) block 112 with stored slow associated control channel (SACCH) blocks 122a-e that are saved in an enhanced slow associated control channel (eSACCH) storage module 125 on the enhanced slow associated control channel (eSACCH) receiving module 106.

The receiving wireless device 104 may determine how similar the slow associated control channel (SACCH) block 112 is to the stored slow associated control channel (SACCH) blocks 122a-e by determining a correlation level between the slow associated control channel (SACCH) block 112 and one or more of the stored slow associated control channel (SACCH) blocks 122a-e. The slow associated control channel (SACCH) block 112 may include information (e.g., system information (SI) or message information (MI)) that corresponds to only one of the stored slow associated control channel (SACCH) blocks 122a-e. Furthermore, the slow associated control channel (SACCH) block 112 may include different types of system information (e.g., System Information Type 5 (SI5), System Information Type 5bis (SI5bis), System Information Type 5ter (SI5ter), and System Information Type 6 (SI6)).

The correlation level may be used to identify which type of system information (SI) or message information (MI) may be included in the slow associated control channel (SACCH) block 112. In one configuration, the receiving wireless device 104 may determine a correlation level between the received slow associated control channel (SACCH) block 112 and each of the stored slow associated control channel (SACCH) blocks 122a-e (i.e., five different correlation levels). The maximum correlation level (of the five determined correlation levels) may indicate which type of information is likely to be included in the slow associated control channel (SACCH) block 112. For example, if the maximum correlation level is the correlation level corresponding to the stored slow associated control channel (SACCH) block 122 that includes System Information type 5 (SI5), then it may be determined that the slow associated control channel (SACCH) block 112 is likely to include System Information type 5 (SI5).

If the maximum correlation level is above a threshold 126 on the enhanced slow associated control channel (eSACCH) receiving module 106, the enhanced slow associated control channel (eSACCH) receiving module 106 may use one or more of the stored slow associated control channel (SACCH) blocks 122 instead of the received slow associated control channel (SACCH) block 112. The threshold 126 may be preset on the enhanced slow associated control channel (eSACCH) receiving module 106 or the threshold 126 may be continuously updated.

The enhanced slow associated control channel (eSACCH) procedure may also reduce the number of dropped calls during a handover from one base station to another. A handover may occur when a wireless communication device moves from the coverage area of one base station to another. However, a wireless communication device may oftentimes be in the coverage areas of two or more base stations. If the signal quality for a first base station falls below the minimum acceptable levels, the wireless communication device may attempt to handover to a second base station. If the handover fails (e.g., if the signal quality of the second base station is worse than the first base station), the wireless communication device may attempt to reestablish a connection with the first base station. During this transition, the radio link counter may fall to 0 and the call may be dropped.

To reduce the number of dropped calls, the enhanced slow associated control channel (eSACCH) receiving module 106 may include a handover storage module 116. The handover storage module 116 may include temporary slow associated control channel (SACCH) blocks 124a-e. When a handover is signaled, the receiving wireless device 104 (in this case a wireless communication device) may save the stored slow associated control channel (SACCH) blocks 122a-e to the temporary slow associated control channel (SACCH) blocks 124a-e.

In the event of a handover failure, the receiving wireless device 104 may restore the stored slow associated control channel (SACCH) blocks 122a-e from the temporary slow associated control channel (SACCH) blocks 124a-e for further use in the enhanced slow associated control channel (eSACCH) procedure. This allows the enhanced slow associated control channel (eSACCH) receiving module 106 to maintain the slow associated control channel (SACCH) blocks 122 corresponding to the first base station during a handover, ensuring that if the handover fails, the enhanced slow associated control channel (eSACCH) receiving module 106 may reuse the maintained slow associated control channel (SACCH) blocks stored in the temporary slow associated control channel (SACCH) blocks 124 without having to re-obtain the slow associated control channel (SACCH) blocks 122 from the first base station. The enhanced slow associated control channel (eSACCH) procedure in the context of base station handover is discussed in additional detail below in connection with FIG. 10.

The receiving wireless device 104 may take advantage of the way the transmitting wireless device 102 divides and sends the slow associated control channel (SACCH) block 112 in multiple subsets. The receiving wireless device 104 receives these subsets of the slow associated control channel (SACCH) block 112 in multiple radio bursts 118a-d. For example, the transmitting wireless device 102 may send the slow associated control channel (SACCH) block 112 to the receiving wireless device 104 in four bursts 118a-d. Each burst 118 may include 114 payload bits that, when combined, form the 456 bit slow associated control channel (SACCH) block 112. In one configuration, the enhanced slow associated control channel (eSACCH) procedure may be performed on only one of the four bursts 118a-d instead of on the entire slow associated control channel (SACCH) block 112. Therefore, the correlation level may be determined for the 114 bits of a burst 118 instead of the complete 456 bit slow associated control channel (SACCH) block 112, which may provide savings in power consumption.

The slow associated control channel (SACCH) block 112 may include a message ID 120. The message ID 120 may indicate the type of information that may be included in the slow associated control channel (SACCH) block 112. The message ID 120 may be certain bits within the slow associated control channel (SACCH) block 112 that indicate whether the slow associated control channel (SACCH) block 112 is system information (SI), message information (MI), or a short message service (SMS) message.

The receiving wireless device 104 may include a current power control level (PCL) 107 and a current timing advance 109 for use in the enhanced slow associated control channel (eSACCH) procedure. Each slow associated control channel (SACCH) block 112 transmitted on a downlink may include a power control level (PCL) and a timing advance. The power control level (PCL) carries information about the uplink power that a wireless communication device should use. The timing advance may be an assignment from the network (e.g., a base station) that includes timing correction information for the wireless communication device.

In one configuration, the receiving wireless device 104 may be a wireless communication device that may receive a slow associated control channel (SACCH) block 112 on the downlink. If the slow associated control channel (SACCH) block 112 passes the integrity check, the receiving wireless device 104 may save the power control level (PCL) included in the slow associated control channel (SACCH) block 112 to the current power control level (PCL) 107. Similarly, if the slow associated control channel (SACCH) block 112 passes the integrity check, the receiving wireless device 104 may save the timing advance included in the slow associated control channel (SACCH) block 112 to the current timing advance 109. Therefore, each time a slow associated control channel (SACCH) block 112 passes the integrity check, the receiving wireless device 104 may store the most current power control level (PCL) and timing advance.

The current power control level (PCL) 107 and current timing advance 109 may be used in an enhanced slow associated control channel (eSACCH) procedure when a slow associated control channel (SACCH) block 112 fails the integrity check, as described below. For example, the receiving wireless device 104 may reuse the current power control level (PCL) 107 and current timing advance 109 to ensure that the most recent power control level (PCL) and timing advance values are used.

Figure 2:
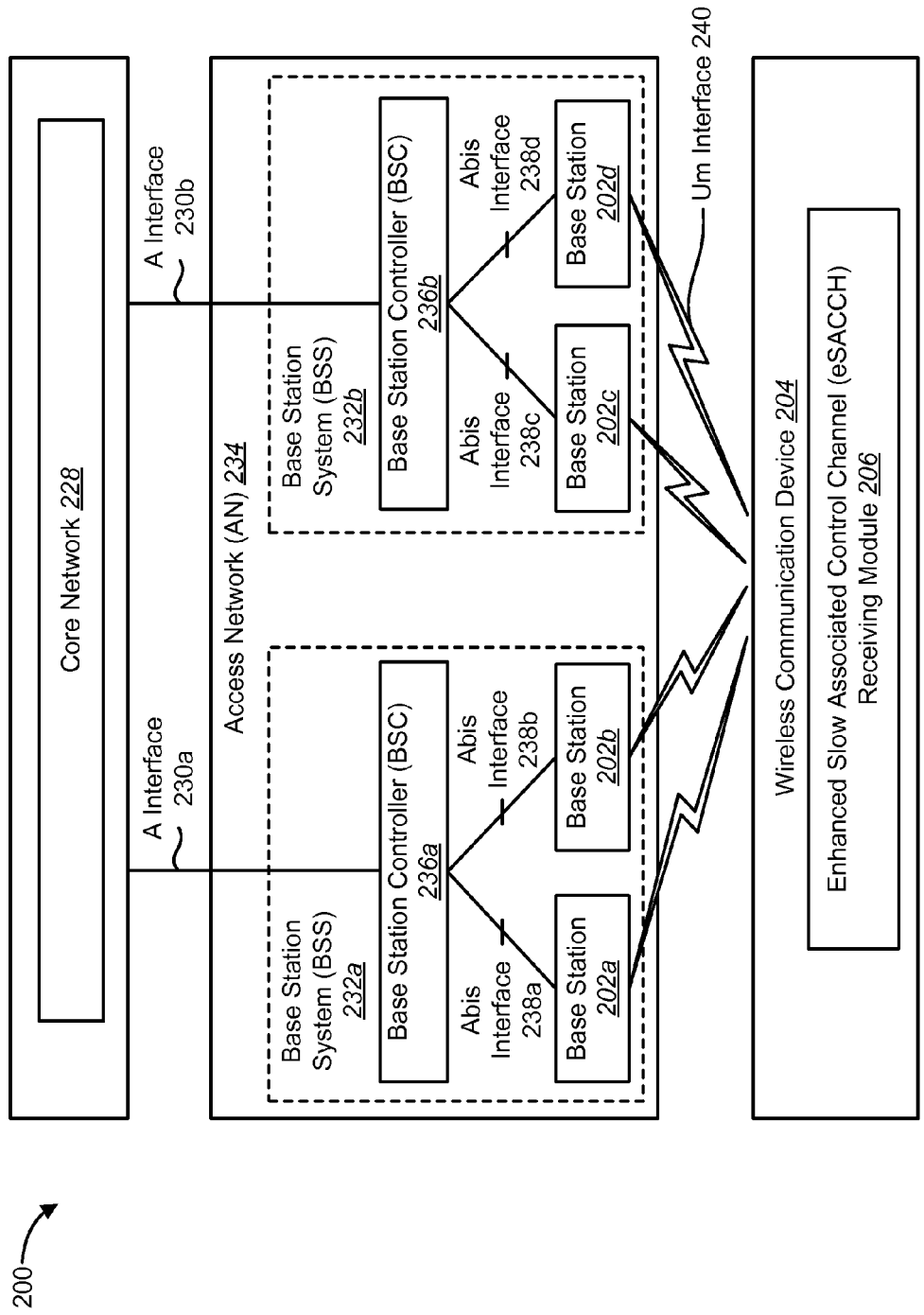
FIG. 2 is a block diagram illustrating a radio network operating according to embodiments of the present invention.

FIG. 2 is a block diagram illustrating a radio network 200 operating according to embodiments of the present invention. The radio network 200 may operate according to Global System for Mobile Communications (GSM) standards and may be referred to as a GSM network. A GSM network is a collective term for the base stations 202a-d and the control equipment for the base stations 202a-d (e.g., base station controllers (BSCs) 236a-b) the GSM network may contain, which make up the access network (AN) 234. The GSM network provides an air interface access method for the wireless communication device 204. In one configuration, the wireless communication device 204 may include an enhanced slow associated control channel (eSACCH) receiving module 206. Connectivity is provided between the wireless communication device 204 and the core network 228 by the GSM network. The access network (AN) 234 may transport data packets between multiple wireless communication devices 204.

The GSM network is connected internally or externally to other functional entities by various interfaces (e.g., an A interface 230a-b, an Abis interface 238a-d, and a Um interface 240). The GSM network is attached to a core network 228 via an external interface (e.g., an A interface 230a-b). The base station controllers (BSCs) 236a-b support this interface. In addition, the base station controllers (BSCs) 236a-b manage a set of base stations 202a-d through Abis interfaces 238a-d. A base station controller (BSC) 236a and the managed base stations 202a-b form a base station system (BSS) 232a. A base station controller (BSC) 236b and the managed base stations 202c-d form a base station system (BSS) 232b. The Um interface 240 connects a base station 202 with a wireless communication device 204, while the Abis interface 238 is an internal interface connecting the base station controller (BSC) 236 with the base station 202.

The radio network 200 may be further connected to additional networks outside the radio network 200, such as a corporate intranet, the Internet, or a conventional public switched telephone network. The radio network 200 may transport data packets between each wireless communication device 204 and such outside networks.

Figure 3:
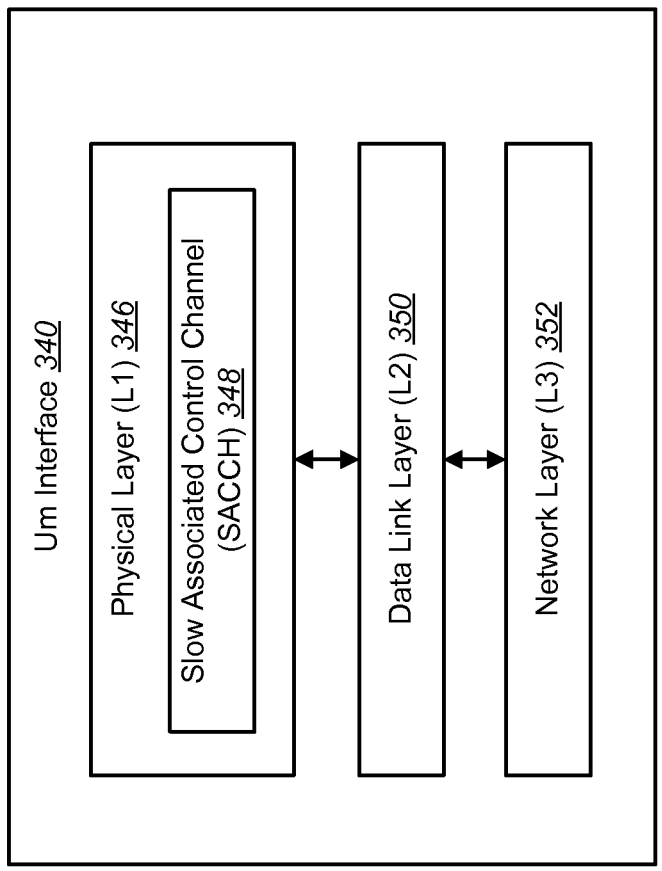
FIG. 3 is a block diagram illustrating a Um interface for use in embodiments of the present invention.

FIG. 3 is a block diagram illustrating a Um interface 340 for use in embodiments of the present invention. The Um interface 340 is an air interface for a GSM network 200. The Um interface 340 is the interface between the receiving wireless device 104 and the transmitting wireless device 102 (i.e., between a base station and a wireless communication device). The Um interface 340 may include three layers: a physical layer (L1) 346, a data link layer (L2) 350 and a network layer (L3) 352. Similar communication functions may be grouped into logical layers. A layer may serve the layer above it and may be served by the layer below it.

The physical layer (L1) 346 may define electrical and physical specifications for devices (e.g., the transmitting wireless device 102 and the receiving wireless device 104). In particular, the physical layer (L1) 346 may define the relationship between a device (e.g., the receiving wireless device 104) and a transmission medium (e.g., a radio interface). The data link layer (L2) 350 may provide functional and procedural means to transfer data between network entities and to detect and possibly correct errors that may occur in the physical layer (L1) 346.

The data link layer (L2) 350 may handle local delivery of frames between devices. A frame is a digital data transmission unit that may include a frame synchronization sequence. The frame synchronization sequence may include a sequence of bits or symbols that may make it possible for a receiver (e.g., the receiving wireless device 104) to detect the beginning and end of the packet in the stream of symbols or bits. For example, if the receiver connects to a system in the middle of a frame transmission, the receiver ignores the data until the receiver detects a new frame synchronization sequence.

The network layer (L3) 352 may handle the transfer of variable length data sequences from a source host on one network to a destination host on a different network. This is in contrast to the data link layer (L2) 350, which connects hosts within the same network. The network layer (L3) 352 may maintain a specified quality of service. The network layer (L3) 352 may also perform network routing functions.

Within the Um interface 340, the physical layer (L1) 346 may include a slow associated control channel (SACCH) 348. The slow associated control channel (SACCH) 348 may carry system information (SI), message information (MI), and short message service (SMS) messages in a slow associated control channel (SACCH) block 112. The slow associated control channel (SACCH) block 112 may be transmitted on the slow associated control channel (SACCH) 348 of the physical layer (L1) 346 over the radio interface in four bursts 118a-d with 114 payload bits per burst. Upon receiving the bursts 118a-d, the receiving wireless device 104 may process the bursts 118a-d to reconstruct the slow associated control channel (SACCH) block 112. The slow associated control channel (SACCH) block 112 may be deciphered, deinterleaved, and decoded. The receiving wireless device 104 may perform an integrity check (e.g., cyclic redundancy check (CRC)) to verify the integrity of the received slow associated control channel (SACCH) block 112. If the slow associated control channel (SACCH) block 112 passes the integrity check, the information included in the slow associated control channel (SACCH) block 112 may be passed on to a higher level of the Um interface (e.g., the data link layer (L2) 350).

In one embodiment of the current invention, a stored slow associated control channel (SACCH) block 122 may be passed to the data link layer (L2) 350 of the receiving wireless device 104. In conventional slow associated control channel (SACCH) decoding, if the slow associated control channel (SACCH) block 112 passes an integrity check (e.g., a cyclic redundancy check (CRC)), the slow associated control channel (SACCH), block 112 is passed to the data link layer (L2) 350. If the slow associated control channel (SACCH) block 112 does not pass the integrity check (for example, if the slow associated control channel (SACCH) block 112 is corrupt), the slow associated control channel (SACCH) block 112 is not passed to the data link layer (L2) and the call may be dropped. However, by performing the enhanced slow associated control channel (eSACCH) procedure, the receiving wireless device 104 may determine whether the maximum correlation level between the currently received slow associated control channel (SACCH) block 112 and the stored slow associated control channel (SACCH) blocks 122*a-e* is above a threshold 126. If the correlation level is above the threshold 126, the receiving wireless device 104 may pass a stored slow associated control channel (SACCH) block 122 to the data link layer (L2) 350.

Figure 4:
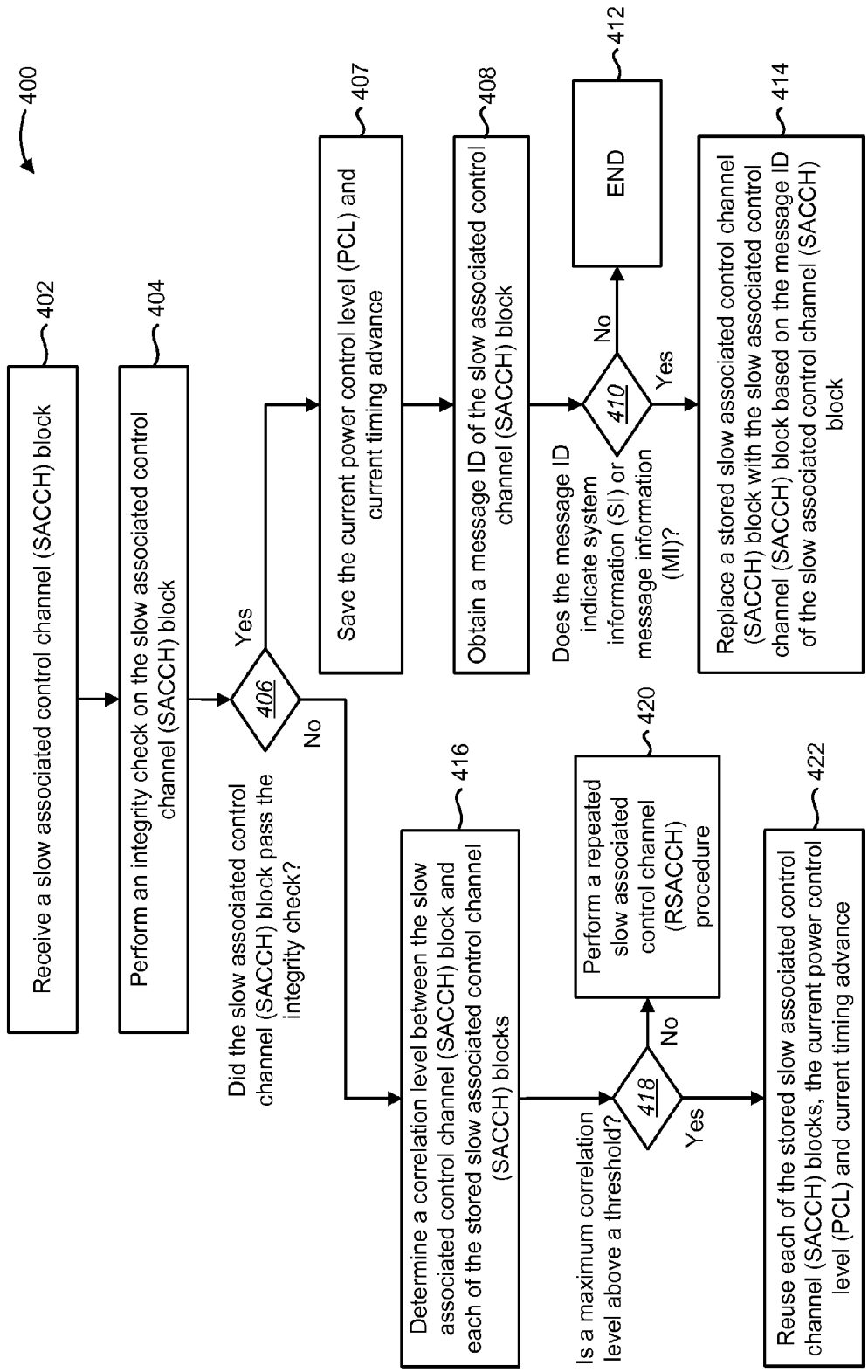
FIG. 4 is a flow diagram of a method for performing an enhanced slow associated control channel (eSACCH) procedure according to some embodiments.

FIG. 4 is a flow diagram of a method 400 for performing an enhanced slow associated control channel (eSACCH) procedure. The method 400 may be performed by a receiving wireless device 104. In one configuration, the receiving wireless device 104 may include an enhanced slow associated control channel (eSACCH) receiving module 106. The receiving wireless device 104 may receive 402 a slow associated control channel (SACCH) block 112. The slow associated control channel (SACCH) block 112 may be received 402 from a transmitting wireless device 102. In one configuration, the slow associated control channel (SACCH) block 112 may be received in four bursts 118*a-d*. Each burst 118*a-d* may include bits or symbols that represent information conveyed by the slow associated control channel (SACCH) block 112. Upon receiving the bursts 118*a-d*, the receiving wireless device 104 may process the bursts 118*a-d* to reconstruct the slow associated control channel (SACCH) block 112.

The receiving wireless device 104 may perform 404 an integrity check on the slow associated control channel (SACCH) block 112. For example, the receiving wireless device 104 may perform 404 a cyclic redundancy check (CRC) on the slow associated control channel (SACCH) block 112. The cyclic redundancy check (CRC) may determine whether the slow associated control channel (SACCH) block 112 is corrupt by detecting changes to the raw data forming the slow associated control channel (SACCH) block 112.

The receiving wireless device 104 may determine 406 whether the slow associated control channel (SACCH) block 112 passes the integrity check. If the slow associated control channel (SACCH) block 112 passes the integrity check, the receiving wireless device 104 may save 407 the power control level (PCL) and timing advance. The power control level (PCL) may be included in a slow associated control channel (SACCH) block 112 sent on the downlink. The receiving wireless device 104 may save 407 the power control level (PCL) to the current power control level (PCL) 107. The receiving wireless device 104 may also save 407 the timing advance to the current timing advance 109.

The receiving wireless device 104 may obtain 408 a message ID 120 of the slow associated control channel (SACCH) block 112. The message ID 120 may indicate the type of information that may be included in the slow associated control channel (SACCH) block 112. The message ID 120 may be certain bits within the slow associated control channel (SACCH) block 112 that indicate whether the slow associated control channel (SACCH) block 112 is system information (SI), message information (MI), or a short message service (SMS) message. In one configuration, the receiving wireless device 104 may obtain 408 the message ID 120 of the slow associated control channel (SACCH) block 112 by evaluating certain bits of the slow associated control channel (SACCH) block 112.

The receiving wireless device 104 may determine 410 whether the message ID 120 indicates that the slow associated control channel (SACCH) block 112 includes system information (SI) or message information (MI). If the message ID 120 indicates that the slow associated control channel (SACCH) block 112 does not include system information (SI) or message information (MI), the enhanced slow associated control channel (eSACCH) procedure ends 412 without saving the slow associated control channel (SACCH) block 112 to one of the stored slow associated control channel (SACCH) blocks 122*a-e* in the enhanced slow associated control channel (eSACCH) storage module 125. In other words, if the message ID 120 indicates that the slow associated control channel (SACCH) block 112 includes short message service (SMS) information, the enhanced slow associated control channel (eSACCH) procedure ends 412 without saving the slow associated control channel (SACCH) block 112 to the stored slow associated control channel (SACCH) blocks 122*a-e*.

If the receiving wireless device 104 determines 410 that the message ID 120 indicates that the slow associated control channel (SACCH) block 112 includes system information (SI) or message information (MI), the receiving wireless device 104 may replace 414 a stored slow associated control channel (SACCH) block 122*a-e* with the slow associated control channel (SACCH) block 112 based on the message ID 120 of the slow associated control channel (SACCH) block 112. In one configuration, if the slow associated control channel (SACCH) block 112 includes system information (SI) or message information (MI), the slow associated control channel (SACCH) block 112 may be saved to a buffer (e.g., a stored slow associated control channel (SACCH) block 122) for future use in the enhanced slow associated control channel (eSACCH) procedure. For example, if the message ID 120 indicates that the slow associated control channel (SACCH) block 112 includes System Information Type 5 (SI5), the slow associated control channel (SACCH) block 112 may be saved to the stored slow associated control channel (SACCH) block 122 that includes System Information Type 5 (SI5).

The receiving wireless device 104 may determine 406 that the slow associated control channel (SACCH) block 112 does not pass the integrity check. For example, if the slow associated control channel (SACCH) block 112 is corrupt, the slow associated control channel (SACCH) block 112 may fail the integrity check (e.g., cyclic redundancy check (CRC)).

If the slow associated control channel (SACCH) block 112 does not pass the integrity check, the receiving wireless device 104 may determine 416 a correlation level between the slow associated control channel (SACCH) block 112 and each of the stored slow associated control channel (SACCH) blocks 122*a-e*. In one configuration, the receiving wireless device 104 may determine 416 a correlation level between the slow associated control channel (SACCH) block 112 and each of the stored slow associated control channel (SACCH) blocks 122a-e to determine a maximum correlation level. As an example, the correlation levels may be determined 416 by performing pattern matching on the slow associated control channel (SACCH) block 112 and each of the stored slow associated control channel (SACCH) blocks 122a-e.

The bits that make up the slow associated control channel (SACCH) block 112 may be compared to the bits that make up a stored slow associated control channel (SACCH) block 122 to determine how similar the slow associated control channel (SACCH) block 112 is to the stored slow associated control channel (SACCH) blocks 122a-e. In one configuration, the correlation level may be the percentage of similarity between the slow associated control channel (SACCH) block 112 and one of the stored slow associated control channel (SACCH) blocks 122a-e.

Upon determining a correlation level between the slow associated control channel (SACCH) block 112 and each of the stored slow associated control channel (SACCH) blocks 122a-e, a maximum correlation level may be determined For example, the maximum correlation level may be the best match found during pattern matching between the slow associated control channel (SACCH) block 112 and each of the stored slow associated control channel (SACCH) blocks 122a-e. The receiving wireless device 104 may determine 418 whether the maximum correlation level is above a threshold 126. The receiving wireless device 104 may set the stored slow associated control channel blocks 122a-e based on the maximum correlation level as described below.

The threshold 126 may indicate an acceptable degree of difference between the slow associated control channel (SACCH) block 112 and the corresponding stored slow associated control channel (SACCH) block 122. For example, the threshold 126 may have a value of 0.7, which indicates that the slow associated control channel (SACCH) block 112 must be at least 70% similar to the corresponding stored slow associated control channel (SACCH) block 122 to be above the threshold 126.

If the receiving wireless device 104 determines 418 that the maximum correlation level is not above the threshold 126, the receiving wireless device 104 may perform 420 a repeated slow associated control channel (RSACCH) procedure. If the maximum correlation level is not above the threshold 126, the slow associated control channel (SACCH) block 112 may be too corrupt and may be discarded. The receiving wireless device 104 may use the repeated slow associated control channel (RSACCH) procedure to attempt to obtain an uncorrupted slow associated control channel (SACCH) block 112.

Through the repeated slow associated control channel (RSACCH) procedure, the receiving wireless device 104 may attempt to notify the transmitting wireless device 102 that the slow associated control channel (SACCH) block 112 was not successfully received. The receiving wireless device 104 may request the transmitting wireless device 102 to send another slow associated control channel (SACCH) block 112. The repeated slow associated control channel (RSACCH) procedure is discussed below in connection with FIG. 8. Therefore, the receiving wireless device 104 may set the stored slow associated control channel blocks 122a-e by performing 420 a repeated slow associated control channel (RSACCH) procedure.

If the receiving wireless device 104 determines 418 that the maximum correlation level is above the threshold 126, the receiving wireless device 104 may reuse 422 each of the stored slow associated control channel (SACCH) blocks 122a-e, the current power control level (PCL) 107 and current timing advance 109. The receiving wireless device 104 may reuse 422 each of the stored slow associated control channel (SACCH) blocks 122a-e for subsequent enhanced slow associated control channel (eSACCH) procedures.

Therefore, the receiving wireless device 104 may set the stored slow associated control channel blocks 122a-e by reusing 422 each of the stored slow associated control channel (SACCH) blocks 122a-e for subsequent enhanced slow associated control channel (eSACCH) procedures. Additionally, the receiving wireless device 104 may reuse 422 each of the stored slow associated control channel (SACCH) blocks 122a-e by passing the values of the stored slow associated control channel (SACCH) blocks 122a-e to upper layers of the Um interface 340 as described in connection with FIG. 3.

The receiving wireless device 104 may additionally reuse 422 the current power control level (PCL) 107 and current timing advance 109. The receiving wireless device 104 may reuse 422 the current power control level (PCL) 107 and current timing advance 109 instead of the power control level (PCL) and timing advance that may be included in the stored slow associated control channel (SACCH) blocks 122a-e. Therefore, instead of using old power control levels (PCLs) and timing advance information, the receiving wireless device 104 may reuse 422 the most recent power control level (PCL) and timing advance that were included in the last slow associated control channel (SACCH) block 112 to pass an integrity check. The receiving wireless device 104 may reuse 422 the current power control level (PCL) 107 and current timing advance 109 by passing the current power control level (PCL) 107 and current timing advance 109 to upper layers of the Um interface 340.

Figure 5:
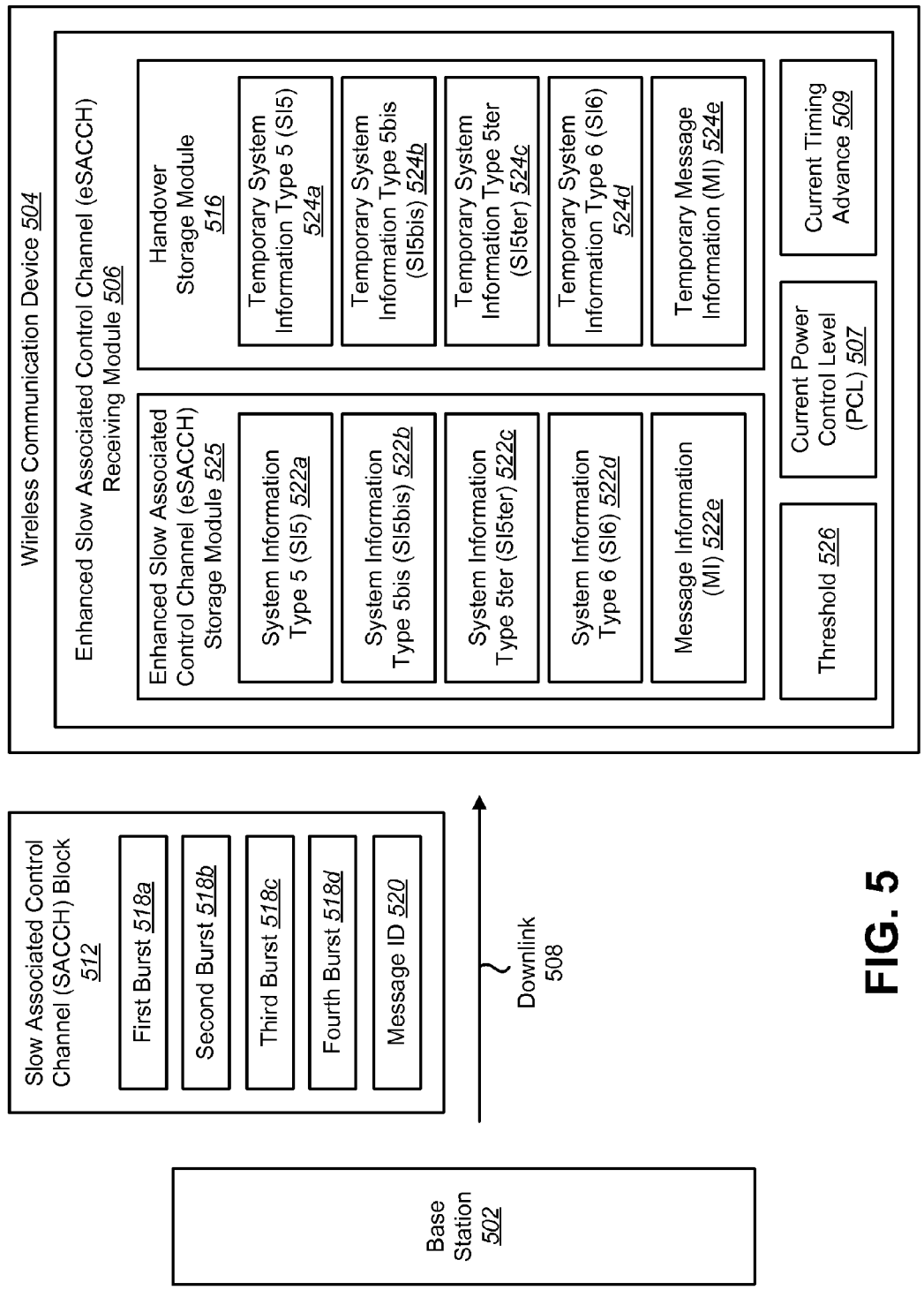
FIG. 5 is a block diagram illustrating the transmission of a slow associated control channel (SACCH) block from a base station to a wireless communication device according to some embodiments.

FIG. 5 is a block diagram illustrating the transmission of a slow associated control channel (SACCH) block 512 from a base station 502 to a wireless communication device 504. In this configuration, the base station 502 corresponds to the transmitting wireless device 102, and the wireless communication device 504 corresponds to the receiving wireless device 104 described above in connection with FIG. 1.

The base station 502 may provide slow associated control channel (SACCH) information to the wireless communication device 504 by transmitting the slow associated control channel (SACCH) block 512 on the downlink 508. The base station 502 may send the slow associated control channel (SACCH) block 512 to the wireless communication device 504 during a call.

The base station 502 may send the slow associated control channel (SACCH) block 512 to the wireless communication device 504 in four bursts 518a-d. Each burst 518 may include 114 payload bits that, when combined, form the 456 bit slow associated control channel (SACCH) block 512. The slow associated control channel (SACCH) block 512 may additionally include a message ID 520 that may indicate the type of information that may be included in the slow associated control channel (SACCH) block 512.

The message ID 520 may be certain bits in the slow associated control channel (SACCH) block 512 that indicate what type of information is included in the slow associated control channel (SACCH) block 512. The slow associated control channel (SACCH) block 512 may include system information (SI), message information (MI), or short message service (SMS) information. The system information may be System Information Type 5 (SI5), System Information Type 5bis (SI5bis), System Information Type 5ter (SI5ter), and System Information Type 6 (SI6). The slow associated control channel (SACCH) may also be used to transfer mobile originated (MO)/mobile terminated (MT) short message service (SMS) messages.

Upon receiving the slow associated control channel (SACCH) block 512, the wireless communication device 504 may perform the enhanced slow associated control channel (eSACCH) procedure. In one configuration, the enhanced slow associated control channel (eSACCH) procedure may be performed by an enhanced slow associated control channel (eSACCH) receiving module 506 on the wireless communication device 504. The enhanced slow associated control channel (eSACCH) receiving module 506 may include an enhanced slow associated control channel (eSACCH) storage module 525 that is used for the enhanced slow associated control channel (eSACCH) procedure. If the slow associated control channel (SACCH) block 512 passes the integrity check (e.g., the cyclic redundancy check (CRC)), the wireless communication device 504 may determine what type of slow associated control channel (SACCH) information is included in the slow associated control channel (SACCH) block 512.

Upon determining what type of slow associated control channel (SACCH) information is included in the slow associated control channel (SACCH) block 512, the wireless communication device 504 may save the slow associated control channel (SACCH) block 512 to a buffer (e.g., stored slow associated control channel (SACCH) blocks 122*a-e*) within the enhanced slow associated control channel (eSACCH) storage module 525 corresponding to the message ID 520 of the slow associated control channel (SACCH) block 512.

For example, if the message ID 520 indicates that the slow associated control channel (SACCH) block 512 includes System Information Type 5 (SI5), the wireless communication device 504 may save the slow associated control channel (SACCH) block 512 to the System Information Type 5 (SI5) 522*a* buffer. If the message ID 520 indicates that the slow associated control channel (SACCH) block 512 includes System Information Type 5bis (SI5bis), the wireless communication device 504 may save the slow associated control channel (SACCH) block 512 to the System Information Type 5bis (SI5bis) 522*b* buffer. If the message ID 520 indicates that the slow associated control channel (SACCH) block 512 includes System Information Type 5ter (SI5ter), the wireless communication device 504 may save the slow associated control channel (SACCH) block 512 to the System Information Type 5ter (SI5ter) 522*c* buffer. If the message ID 520 indicates that the slow associated control channel (SACCH) block 512 includes System Information Type 6 (SI6), the wireless communication device 504 may save the slow associated control channel (SACCH) block 512 to the System Information Type 6 (SI6) 522*d* buffer. If the message ID 520 indicates that the slow associated control channel (SACCH) block 512 includes message information (MI), the wireless communication device 504 may save the slow associated control channel (SACCH) block 512 to the message information (MI) buffer 522*e*.

If the slow associated control channel (SACCH) block 512 does not pass the integrity check, the wireless communication device 504 may use the stored slow associated control channel (SACCH) blocks 122*a-e* (i.e., the System Information Type 5 (SI5) 522*a*, System Information Type 5bis (SI5bis) 522*b*, System Information Type 5ter (SI5ter) 522*c*, System Information Type 6 (SI6) 522*d*, and message information (MI) 522*e*) saved in the enhanced slow associated control channel (eSACCH) storage module 525 to determine a correlation level between the slow associated control channel (SACCH) block 512 and the stored slow associated control channel (SACCH) blocks 122*a-e*. The correlation level may be determined as described in connection with FIG. 4 and FIG. 7. For example, the wireless communication device 504 may determine whether the correlation level is above a threshold 526. If the correlation level is above the threshold 526, the wireless communication device 504 may reuse the stored slow associated control channel (SACCH) blocks 122*a-e*. If the correlation level is below the threshold 526, the wireless communication device 504 may discard the slow associated control channel (SACCH) block 512 and perform a repeated slow associated control channel (RSACCH) procedure.

The wireless communication device 504 may also include a handover storage module 516. The handover storage module 516 may reduce the number of dropped calls during a handover. The handover storage module 516 may include temporary slow associated control channel (SACCH) blocks 124*a-e*. When a handover is signaled, the wireless communication device 504 may save the stored slow associated control channel (SACCH) blocks 122*a-e* to temporary buffers 524*a-e* (e.g., temporary slow associated control channel (SACCH) blocks 124*a-e*) that correspond to the type of slow associated control channel (SACCH) information included in the stored slow associated control channel (SACCH) blocks 122*a-e*. For example, the wireless communication device 504 may save the System Information Type 5 (SI5) 522*a* buffer to the temporary System Information Type 5 (SI5) 524*a* buffer. In the event of a handover failure, the wireless communication device 504 may restore the stored slow associated control channel (SACCH) blocks 122*a-e* from the temporary slow associated control channel (SACCH) blocks 124*a-e* for further use in the enhanced slow associated control channel (eSACCH) procedure.

The wireless communication device 504 may include a current power control level (PCL) 507 and a current timing advance 509 for use in the enhanced slow associated control channel (eSACCH) procedure. The slow associated control channel (SACCH) block 512 received on the downlink 508 may include a power control level (PCL) and a timing advance. If the slow associated control channel (SACCH) block 512 passes the integrity check, the wireless communication device 504 may save the power control level (PCL) included in the slow associated control channel (SACCH) block 512 to the current power control level (PCL) 507. Similarly, if the slow associated control channel (SACCH) block 512 passes the integrity check, the wireless communication device 504 may save the timing advance included in the slow associated control channel (SACCH) block 512 to the current timing advance 509. Therefore, each time a slow associated control channel (SACCH) block 512 passes the integrity check, the wireless communication device 504 may store the most current power control level (PCL) and timing advance.

The current power control level (PCL) 507 and current timing advance 509 may be used in an enhanced slow associated control channel (eSACCH) procedure when a slow associated control channel (SACCH) block 512 fails the integrity check, as described below in connection with FIG. 7. For example, the wireless communication device 504 may reuse the current power control level (PCL) 507 and current timing advance 509 to ensure that the most recent power control level (PCL) and timing advance values are used.

Figure 6:
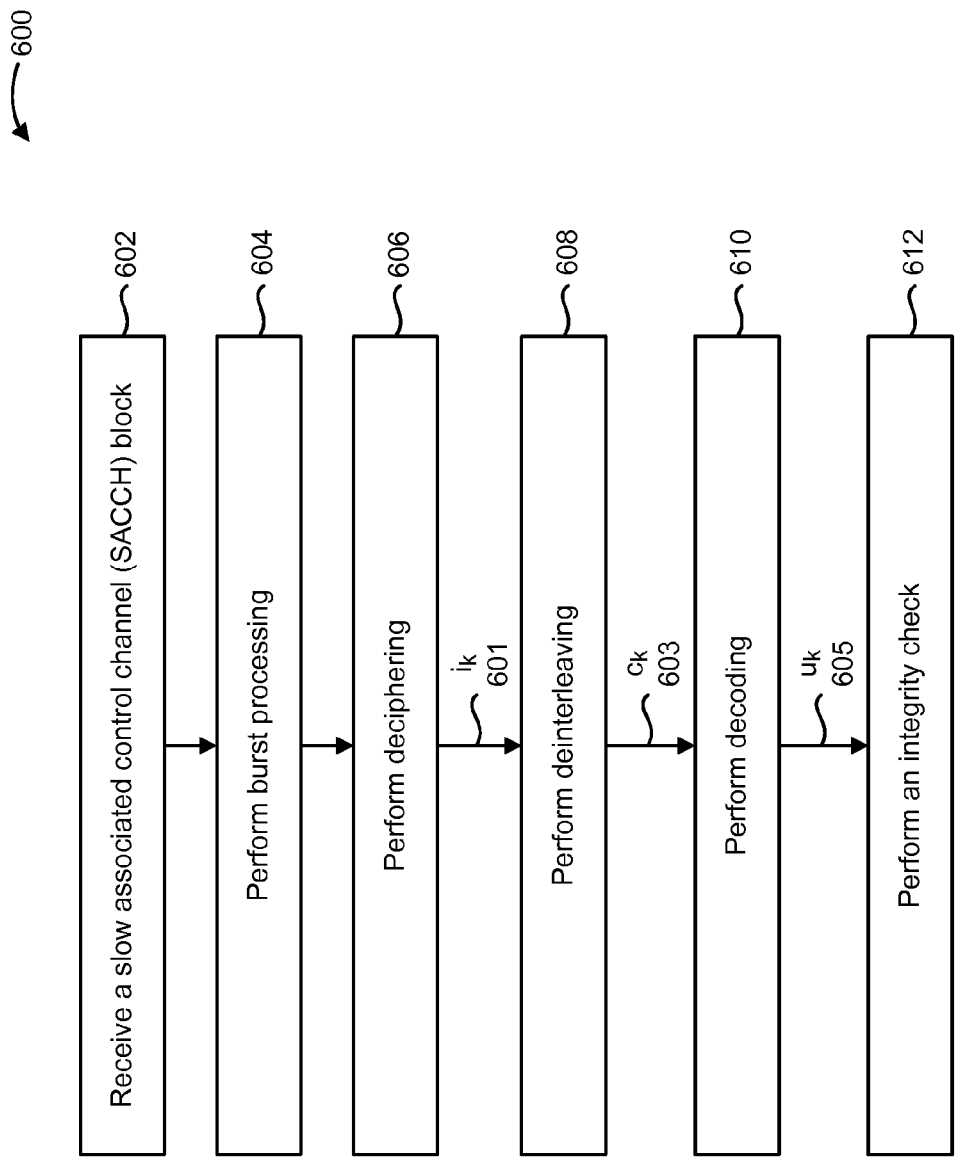
FIG. 6 is a flow diagram of a method for decoding a received slow associated control channel (SACCH) block as part of an enhanced slow associated control channel (eSACCH) procedure according to some embodiments.

FIG. 6 is a flow diagram of a method 600 for decoding a received slow associated control channel (SACCH) block 512 as part of an enhanced slow associated control channel (eSACCH) procedure. In the configuration described, the method 600 may be performed by a wireless communication device 504. In another configuration, the method 600 may be performed by a base station 502. The wireless communication device 504 and the base station 502 may each include an enhanced slow associated control channel (eSACCH) receiving module 506.

The wireless communication device 504 may receive 602 a slow associated control channel (SACCH) block 112. The wireless communication device 504 may receive 602 the slow associated control channel (SACCH) block 512 in one or more bursts 118a-d sent from a base station 502. The one or more bursts 118a-d may be sent as a radio frequency transmission that is received 602 by an antenna on the wireless communication device 504 and passed to a receiver front end (RXFE).

The wireless communication device 504 may perform 604 burst processing. For example, the received bursts 518a-d may be recombined to obtain the slow associated control channel (SACCH) block 512.

The wireless communication device 504 may perform 606 deciphering. For example, upon processing the received bursts 518a-d to obtain a recombined slow associated control channel (SACCH) block 112, the wireless communication device 504 may decipher the slow associated control channel (SACCH) block 512 to obtain a deciphered slow associated control channel (SACCH) block ($i_k$) 601.

The wireless communication device 504 may perform 608 deinterleaving on the deciphered slow associated control channel (SACCH) block ($i_k$) 601 to obtain an encoded slow associated control channel (SACCH) block ($c_k$) 603. The encoded slow associated control channel (SACCH) block ($c_k$) 603 may include 456 bits.

The wireless communication device 504 may also perform 610 decoding on the deinterleaved slow associated control channel (SACCH) block ($c_k$) 603 to obtain a decoded slow associated control channel (SACCH) block ($u_k$) 605. The decoded slow associated control channel (SACCH) block ($u_k$) 605 may be half-rate coded (and include 228 bits).

The wireless communication device 504 may then perform 612 an integrity check on the decoded slow associated control channel (SACCH) block ($u_k$) 605. For example, the wireless communication device 504 may perform a cyclic redundancy check (CRC) on the decoded slow associated control channel (SACCH) block ($u_k$) 605 to determine whether the slow associated control channel (SACCH) block 112 is corrupt. The integrity check may be performed 612 as described in connection with FIG. 4 and FIG. 7.

Figure 7:
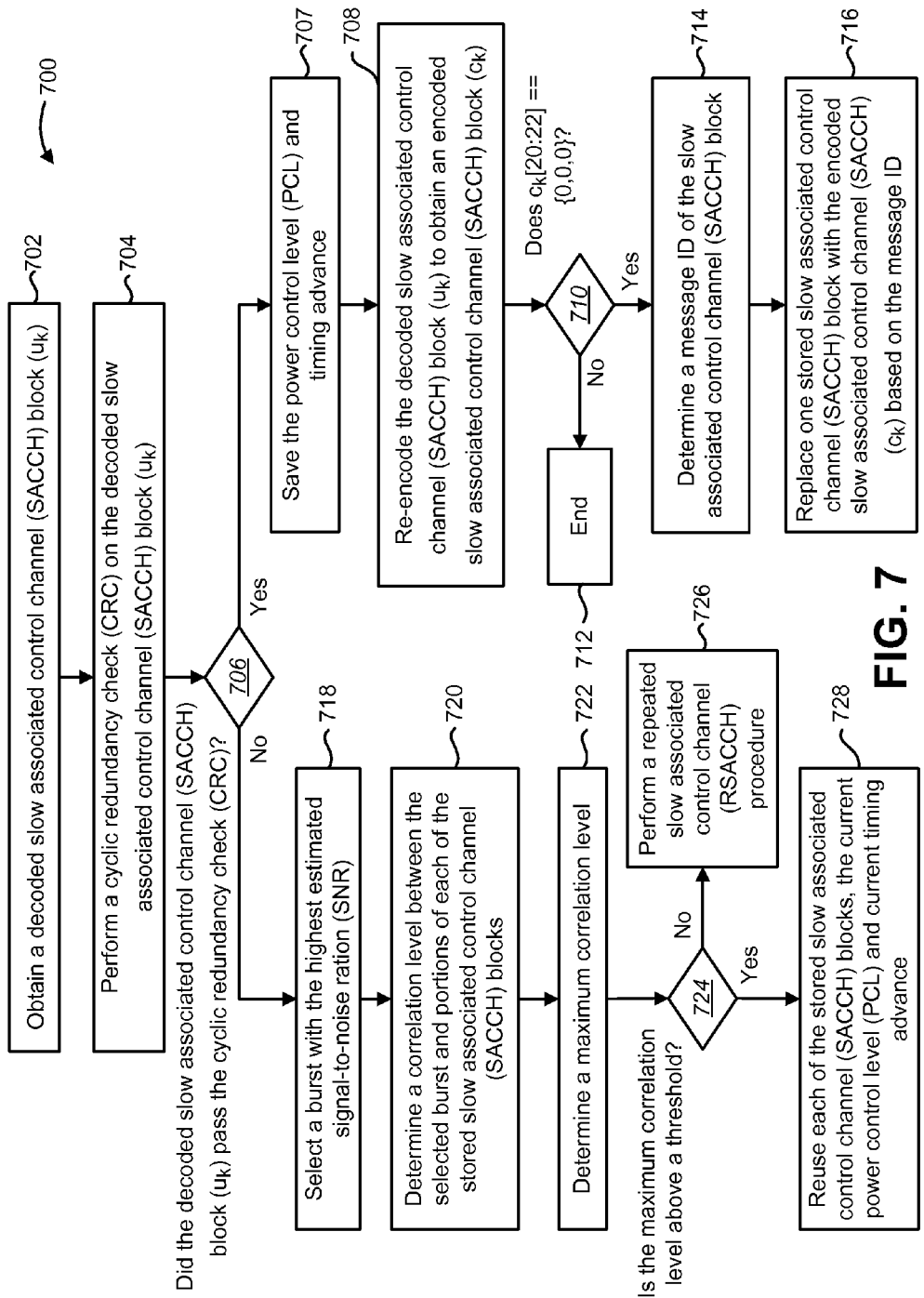
FIG. 7 is a flow diagram of a more detailed method for performing an enhanced slow associated control channel (eSACCH) procedure according to some embodiments.

FIG. 7 is a flow diagram of a more detailed method 700 for performing an enhanced slow associated control channel (eSACCH) procedure. The method 700 may be performed by a receiving wireless device 104. In one configuration the receiving wireless device 104 may be a wireless communication device 504. In another configuration, the receiving wireless device 104 may be a base station 502. The receiving wireless device 104 may include an enhanced slow associated control channel (eSACCH) receiving module 106. The receiving wireless device 104 may obtain 702 a decoded slow associated control channel (SACCH) block ($u_k$) 605.

The receiving wireless device 104 may perform 704 a cyclic redundancy check (CRC) on the decoded slow associated control channel (SACCH) block ($u_k$) 605. The cyclic redundancy check (CRC) may be used to determine the integrity of the slow associated control channel (SACCH) block 112. For example, the cyclic redundancy check (CRC) may include error-detecting code that may detect unintended changes to the raw data that forms the slow associated control channel (SACCH) block 112.

The receiving wireless device 104 may determine 706 whether the decoded slow associated control channel (SACCH) block ($u_k$) 605 passed the cyclic redundancy check (CRC). If the decoded slow associated control channel (SACCH) block ($u_k$) 605 passed the cyclic redundancy check (CRC), the receiving wireless device 104 may save 707 the power control level (PCL) and timing advance. The power control level (PCL) and/or the timing advance may be included in a slow associated control channel (SACCH) block 112 sent on the downlink 508. The receiving wireless device 104 may save 707 the power control level (PCL) to the current power control level (PCL) 107. The receiving wireless device 104 may also save 707 the timing advance to the current timing advance 109.

The receiving wireless device 104 may re-encode 708 the decoded slow associated control channel (SACCH) block ($u_k$) 605 to obtain an encoded slow associated control channel (SACCH) block ($c_k$) 603. The receiving wireless device 104 may then determine 710 whether system information (SI) or message information (MI) is included in the slow associated control channel (SACCH) block 112. A service access point identifier (SAPI) included in the encoded slow associated control channel (SACCH) block ($c_k$) 603 may indicate whether system information (SI) or message information (MI) is included in the slow associated control channel (SACCH) block 112. The service access point identifier (SAPI) may be used to distinguish between system information (SI) or message information (MI), which both have a SAPI value of 0, and short message service (SMS) information, which has a SAPI value of 3. The service access point identifier (SAPI) information is included in the third, fourth, and fifth bits of the third octet of the encoded slow associated control channel (SACCH) block ($c_k$) 603.

In one configuration, the receiving wireless device 104 may determine 710 whether the slow associated control channel (SACCH) block 112 includes either system information (SI) or message information (MI) using Equation (1):

$$\text{Does } c_k[20:22] == \{0,0,0\}? \tag{1}$$

If Equation (1) is true, then the third, fourth, and fifth bits of the third octet of the encoded slow associated control channel (SACCH) block ($c_k$) 603 each equal 0, which indicates that either system information (SI) or message information (MI) is included in the slow associated control channel (SACCH) block 112. If Equation (1) is false, then one or more of the third, fourth, and fifth bits of the third octet of the encoded slow associated control channel (SACCH) block ($c_k$) 603 do not equal 0, which indicates that neither system information (SI) nor message information (MI) is included in the slow associated control channel (SACCH) block 112. In one configuration, if the receiving wireless device 104 determines 710 that Equation (1) is false (i.e., that the slow associated control channel (SACCH) block 112 includes neither system information (SI) nor message information (MI)), the enhanced slow associated control channel (eSACCH) procedure may end 712.

If the receiving wireless device 104 determines 710 that Equation (1) is true (i.e., that the slow associated control channel (SACCH) block 112 includes either system information (SI) or message information (MI)), the receiving wireless device 104 may determine 714 a message ID 120 of the slow associated control channel (SACCH) block 112. The message ID 120 may indicate what type of system information (SI) or message information (MI) is included in the slow associated control channel (SACCH) block 112. For example, the system information may be System Information Type 5 (SI5), System Information Type 5bis (SI5bis), System Information Type 5ter (SI5ter), and System Information Type 6 (SI6). The message ID 120 may be determined 714 from the encoded slow associated control channel (SACCH) block ($c_k$) 603. In one configuration, the message ID 120 may be the first three bits of the seventh octet of the encoded slow associated control channel (SACCH) block ($c_k$) 603, which indicates the type of system information (SI) or message information (MI) included in the slow associated control channel (SACCH) block 112.

The receiving wireless device 104 may replace 716 one stored slow associated control channel (SACCH) block 122 with the encoded slow associated control channel (SACCH) block ($c_k$) 603 based on the message ID 120. For example, if the message ID 120 indicates that the encoded slow associated control channel (SACCH) block ($c_k$) 603 includes System Information Type 5 (SI5), the encoded slow associated control channel (SACCH) block ($c_k$) 603 may be saved to the stored slow associated control channel (SACCH) block 122a that includes System Information Type 5 (SI5) (i.e., the System Information Type 5 (SI5) 522a buffer). If the message ID 120 indicates that the encoded slow associated control channel (SACCH) block ($c_k$) 603 includes System Information Type 5bis (SI5bis), the encoded slow associated control channel (SACCH) block ($c_k$) 603 may be saved to the stored slow associated control channel (SACCH) block 122b that includes System Information Type 5bis (SI5bis) (i.e., the System information Type 5bis (SI5bis) 522b buffer), and so forth.

Upon replacing 716 one stored slow associated control channel (SACCH) block 122 with the encoded slow associated control channel (SACCH) block ($c_k$) 603, the receiving wireless device 104 may use the new stored slow associated control channel (SACCH) block 122 in subsequent enhanced slow associated control channel (eSACCH) procedures. Thus, each time new decoded slow associated control channel (SACCH) blocks ($u_k$) 605 are received that pass the cyclic redundancy check (CRC), the stored slow associated control channel (SACCH) block 122 with the same message ID 120 as the new encoded slow associated control channel (SACCH) block ($c_k$) 603 may be replaced with the new encoded slow associated control channel (SACCH) block ($c_k$) 603, keeping the stored slow associated control channel (SACCH) blocks 122a-e up to date with the most current system information (SI) and message information (MI).

If the receiving wireless device 104 determines 706 that the decoded slow associated control channel (SACCH) block ($u_k$) 605 does not pass the cyclic redundancy check (CRC), the receiving wireless device 104 may select 718 a burst 118 with the highest estimated signal-to-noise ratio (SNR). As discussed above, the slow associated control channel (SACCH) block 112 received from the transmitting wireless device 102 may be received in four bursts 118a-d. The receiving wireless device 104 may select 718 the burst 118 with the highest signal-to-noise ratio (SNR) to obtain the best quality burst 118. In other words, the burst 118 with the highest estimated signal-to-noise ratio (SNR) may be the least corrupt burst 118. The selected burst 118 may be represented as burst$_i$, where i∈{0-3}. Therefore, burst$_0$ corresponds to the first burst 118a, burst$_1$ corresponds to the second burst 118b, and so on.

The receiving wireless device 104 may determine 720 a correlation level between the selected burst 118 and portions of each of the stored slow associated control channel (SACCH) blocks 122a-e. For example, the receiving wireless device 104 may determine 720 a correlation level by performing pattern matching on the selected burst 118 and each of the stored slow associated control channel (SACCH) blocks 122a-e. The bits that make up the selected burst 118 may be compared to the bits of stored slow associated control channel (SACCH) blocks 122a-e that correspond to the selected burst 118. The correlation level may be represented by the following equation:

$$Yx = <c^*, Px^*>/abs(c^*). \quad (2)$$

In Equation (2), Yx is the correlation level for a stored slow associated control channel (SACCH) block 122, c* is the burst$_i$ corresponding to the received encoded slow associated control channel (SACCH) block ($c_k$) 603, and Px* is the burst$_i$ corresponding to the stored slow associated control channel (SACCH) block 122. Equation (2) may be a bitwise operation. The bits in c* may be compared with the bits in Px*.

In one example of computing the correlation level according to Equation (2), the signs of the bits (e.g., plus or minus 1s) in the stored slow associated control channel (SACCH) block 122 may be multiplied by the soft values (which are signed (e.g., plus or minus 1s)) in the received encoded slow associated control channel (SACCH) block ($c_k$) 603. The results are added together and divided by the sum of the absolute value of the numbers in the received encoded slow associated control channel (SACCH) block ($c_k$) 603. Therefore, if each of the bits in the received encoded slow associated control channel (SACCH) block ($c_k$) 603 has the same sign as each of the corresponding bits the stored slow associated control channel (SACCH) block 122, then the numerator becomes the same as the denominator, which results in a correlation level of 1 (e.g., 100% correlation). However, if one or more bit in the received encoded slow associated control channel (SACCH) block ($c_k$) 603 has a different sign than a corresponding bit in the stored slow associated control channel (SACCH) block 122, the numerator will be less than the denominator, which results in a correlation level that is less than 1. In Equation (2), c* may be determined according to the Equation (3):

$$c^* = c_{i+4k}. \quad (3)$$

In Equation (2), Px* may be determined according to Equation (4):

$$Px^* = Px_{i+4k}. \quad (4)$$

In Equations (3) and (4), k={0, ..., 113} corresponding to the 114 bits of burst$_i$ and x={1 ... 5} corresponding to the stored slow associated control channel (SACCH) blocks 122a-e.

The receiving wireless device 104 may determine 722 a maximum correlation level. The receiving wireless device 104 may determine 722 the maximum correlation level by finding the maximum value of the previously determined correlation levels. The maximum correlation level may be determined 722 using Equation (5):

$$Ym = \max(Y1, \ldots, Y5). \quad (5)$$

In Equation (5) Ym is the maximum correlation level. The maximum correlation level (Ym) may be the amount of correlation (i.e., the accuracy) between the selected burst from the encoded slow associated control channel (SACCH) block ($c_k$) 603 and the corresponding the stored $c_k$ symbols in one of the buffers.

The receiving wireless device 104 may determine 724 whether the maximum correlation level is above a threshold 126. In one configuration, the receiving wireless device 104 may determine 724 whether the maximum correlation level is above a threshold 126 by evaluating Equation (6):

$$\text{Is } Ym > Th? \quad (6)$$

In Equation (6) Th is the threshold 126.

If the receiving wireless device 104 determines 724 that the maximum correlation level is not above the threshold 126, the receiving wireless device 104 may perform 726 a repeated slow associated control channel (RSACCH) procedure. For example, if Equation (6) is false (i.e., the maximum correlation level (Ym) is less than the threshold (Th) 126), then the receiving wireless device 104 may discard the corrupt slow associated control channel (SACCH) block 112. Additionally, the receiving wireless device 104 may perform 726 a repeated slow associated control channel (RSACCH) procedure to request that the transmitting wireless device 102 retransmit the corrupt slow associated control channel (SACCH) block 112. The repeated slow associated control channel (RSACCH) procedure will be as discussed below in connection with FIG. 8.

If the receiving wireless device 104 determines 724 that the maximum correlation level is above the threshold 126, the receiving wireless device 104 may reuse 728 each of the stored slow associated control channel (SACCH) blocks 122a-e, the current power control level (PCL) 107 and the current timing advance 109. For example, if Equation (6) is true (the maximum correlation level (Ym) is greater than the threshold (Th) 126), then the receiving wireless device 104 may reuse 728 each of the stored slow associated control channel (SACCH) blocks 122a-e for subsequent enhanced slow associated control channel (eSACCH) procedures. In one configuration, the receiving wireless device 104 may reuse 728 each of the stored slow associated control channel (SACCH) blocks 122a-e by passing the values of the stored slow associated control channel (SACCH) blocks 122a-e to upper layers of the Um interface 340 (e.g., the data link layer (L2) 350).

The receiving wireless device 104 may additionally reuse 728 the current power control level (PCL) 107 and the current timing advance 109. The receiving wireless device 104 may reuse 728 the current power control level (PCL) 107 and the current timing advance 109 instead of the power control level (PCL) and the timing advance included in the stored slow associated control channel (SACCH) blocks 122a-e. For example, if the receiving wireless device 104 determines 724 that the maximum correlation is above the threshold 126, the receiving wireless device 104 may reuse 728 the stored slow associated control channel (SACCH) blocks 122a-e. However, the power control levels (PCLs) and timing advance information included in the stored slow associated control channel (SACCH) blocks 122a-e may not be current.

Therefore, instead of using old power control levels (PCLs) and timing advance information, the receiving wireless device 104 may reuse 728 the most recent power control level (PCL) and timing advance that were included in the last slow associated control channel (SACCH) block 112 to pass an integrity check (by updating the current power control level (PCL) 107 and the current timing advance 109 whenever a slow associated control channel (SACCH) block 112 passes an integrity check). The receiving wireless device 104 may reuse 728 the current power control level (PCL) 107 and current timing advance 109 by passing the current power control level (PCL) 107 and current timing advance 109 to upper layers of the Um interface 340 as described in connection with FIG. 3.

The stored slow associated control channel (SACCH) blocks 122a-e may be initially set at zero. To ensure that the correlation level is determined for the correct system information (SI) and message information (MI), the receiving wireless device 104 may reset the values saved in the stored slow associated control channel (SACCH) blocks 122a-e when the receiving wireless device 104 first connects to the network. Therefore, the receiving wireless device 104 may flush the stored slow associated control channel (SACCH) blocks 122a-e by setting the stored slow associated control channel (SACCH) blocks 122a-e to zero. Additionally, the receiving wireless device 104 may initialize the stored slow associated control channel (SACCH) blocks 122a-e when the receiving wireless device 104 first connects with a new transmitting wireless device 102.

Figure 8:
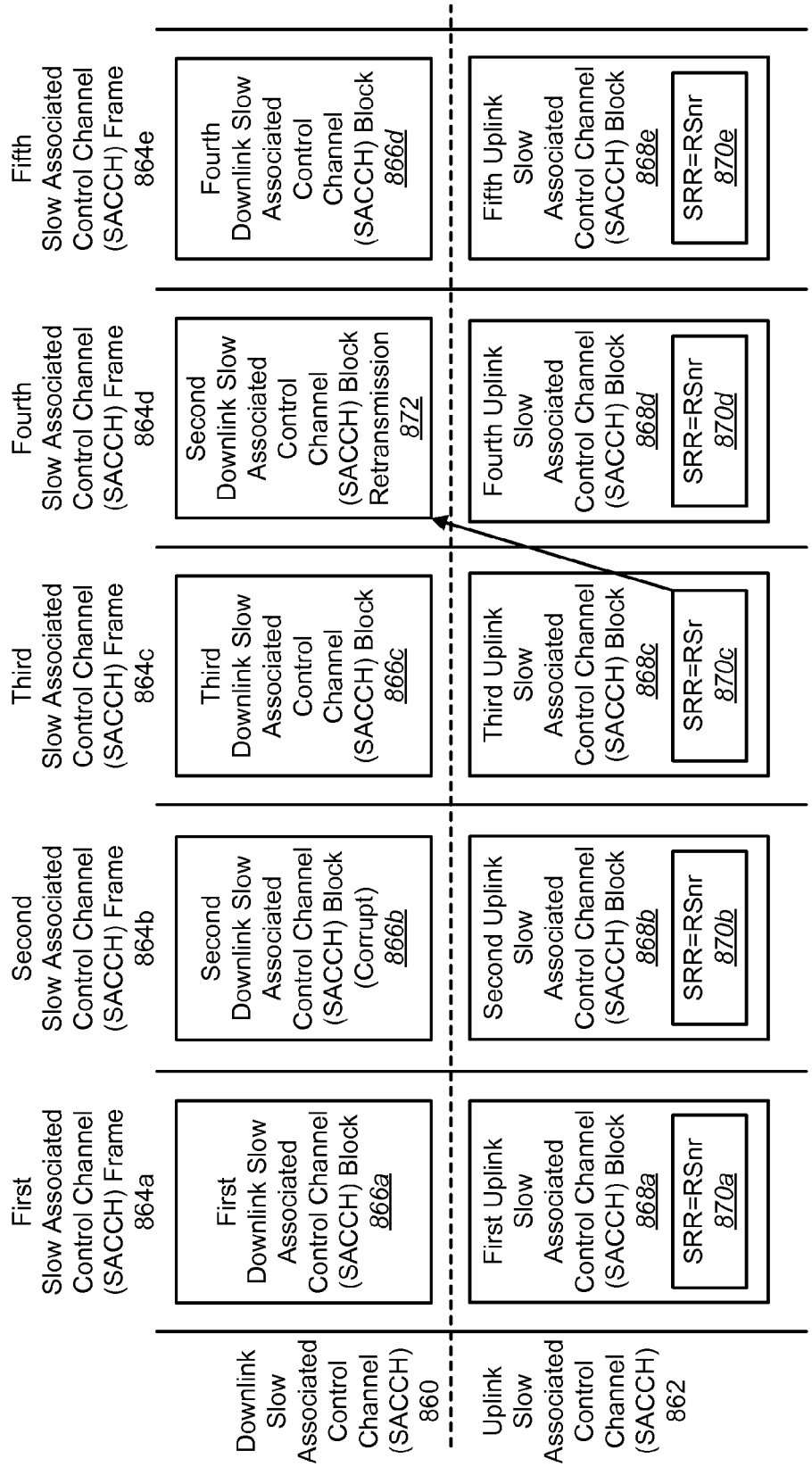
FIG. 8 is a block diagram illustrating a repeated slow associated control channel (RSACCH) procedure that may be used in accordance with some embodiments.

FIG. 8 is a block diagram illustrating a repeated slow associated control channel (RSACCH) procedure that may be used in an embodiment of the invention. The repeated slow associated control channel (RSACCH) procedure is a known approach that may improve channel performance during a call. Through the repeated slow associated control channel (RSACCH) procedure, a receiving wireless device 104 may request retransmission of a slow associated control channel (SACCH) block.

Both the downlink slow associated control channel (SACCH) 860 and the uplink slow associated control channel (SACCH) 862 are illustrated in FIG. 8. The transmitting wireless device 102 (i.e., a base station 502) may send downlink slow associated control channel (SACCH) blocks 866a-d to the receiving wireless device 104 (i.e., a wireless communication device 504). The receiving wireless device 104 may send uplink slow associated control channel (SACCH) blocks 868a-e to the transmitting wireless device 102. The downlink slow associated control channel (SACCH) blocks 866a-d and corresponding uplink slow associated control channel (SACCH) blocks 868a-e may be sent in slow associated control channel (SACCH) frames 864a-e. Each uplink slow associated control channel (SACCH) block 868 may include a flag that is a slow associated control channel (SACCH) repetition request (SRR) 870a-e. The slow associated control channel (SACCH) repetition request (SRR) 870 may be used to request retransmission of a downlink slow associated control channel (SACCH) block 866.

In one example, if the receiving wireless device 104 fails to decode the corrupt second downlink slow associated control channel (SACCH) block 866b (received in the second slow associated control channel (SACCH) frame 864b), the receiving wireless device 104 may request retransmission of the second slow associated control channel (SACCH) block 866b by changing the slow associated control channel (SACCH) repetition request (SRR) 870 (e.g., SRR=RSr) on the third slow associated control channel (SACCH) frame 864c. The network may then retransmit the slow associated control channel (SACCH) block 866b in the fourth slow associated control channel (SACCH) frame 864d (as the second downlink slow associated control channel (SACCH) block retransmission 872). If the network does not send a second downlink slow associated control channel (SACCH) block retransmission 872 in the fourth slow associated control channel (SACCH) frame 864d, but instead retransmits the second downlink slow associated control channel (SACCH) block retransmission 872 after the fourth slow associated control channel (SACCH) frame 864d, the second downlink slow associated control channel (SACCH) block 866b will not be correctly combined with the information received in the second slow associated control channel (SACCH) frame 864b.

It should be noted that each downlink slow associated control channel (SACCH) block 866 may include a slow associated control channel (SACCH) repetition order (SRO) flag (not shown). The slow associated control channel (SACCH) repetition order (SRO) may be used to request retransmission of an uplink slow associated control channel (SACCH) block 868. For example, a base station 502 may issue a slow associated control channel (SACCH) repetition order (SRO) to a wireless communication device 504 if the base station 502 receives a corrupt uplink slow associated control channel (SACCH) block 868.

In the repeated slow associated control channel (RSACCH) procedure, each time a slow associated control channel (SACCH) block 112 fails the integrity check (e.g., the cyclic redundancy check (CRC)), soft decisions may be saved or combined with previous saved soft decisions (of failed slow associated control channel (SACCH) blocks) and the cyclic redundancy check (CRC) may be attempted again. If the soft-combined encoded slow associated control channel (SACCH) blocks ($c_k$) fail the cyclic redundancy check (CRC) as well, the soft decisions of the current slow associated control channel (SACCH) block 112 may be saved in the location for previous soft decisions. The soft decisions may be combined for alternate slow associated control channel (SACCH) blocks 112 (i.e., odd soft decisions may be combined with odd soft decisions and even soft decisions may be combined with even soft decisions). Two buffers may be maintained, one for the odd soft decisions and one for the even soft decisions.

The enhanced slow associated control channel (eSACCH) procedure disclosed herein provides benefits over the conventional slow associated control channel (SACCH) integrity check and repeated slow associated control channel (RSACCH). For example, the enhanced slow associated control channel (eSACCH) procedure may improve call retention by improving the slow associated control channel (SACCH) decode. This may be accomplished by exploiting the repetition in the slow associated control channel (SACCH) message sent by the network. The enhanced slow associated control channel (eSACCH) procedure disclosed herein does not require network support to repeat the slow associated control channel (SACCH) when the decode fails in the very next downlink slow associated control channel (SACCH) frame. For instance, the enhanced slow associated control channel (eSACCH) procedure may be beneficial if either a base station 502 does not receive a slow associated control channel (SACCH) repetition request (SRR) 870, or a wireless communication device 504 does not receive an slow associated control channel (SACCH) repetition order (SRO).

Whereas repeated slow associated control channel (RSACCH) requires a particular repetition sequence, the enhanced slow associated control channel (eSACCH) procedure does not depend on any repetition sequence. Additionally, the enhanced slow associated control channel (eSACCH) procedure is a low complexity solution based on pattern matching over a subset of the slow associated control channel (SACCH) block 112. In one embodiment, the enhanced slow associated control channel (eSACCH) procedure may only use 114 bits (a quarter of a slow associated control channel (SACCH) block 112) to perform pattern matching (e.g., determine the correlation level). Repeated slow associated control channel (RSACCH), on the other hand, requires re-combining of all 456 bits to operate correctly. Thus, the enhanced slow associated control channel (eSACCH) procedure is considerably less complex than the repeated slow associated control channel (RSACCH).

Additionally, in the enhanced slow associated control channel (eSACCH) procedure the correlation level may be determined at the decode level after deciphering. Thus, the pattern matching that may be used in determining the correlation level is immune to ciphering at the burst level. In the future, the network may sequentially transmit both ciphered and non-ciphered slow associated control channel (SACCH) messages. Because the pattern matching in enhanced slow associated control channel (eSACCH) is immune to ciphering, enhanced slow associated control channel (eSACCH) can be used when the network is updated to sequentially transmit both ciphered and non-ciphered slow associated control channel (SACCH) messages.

Figure 9:
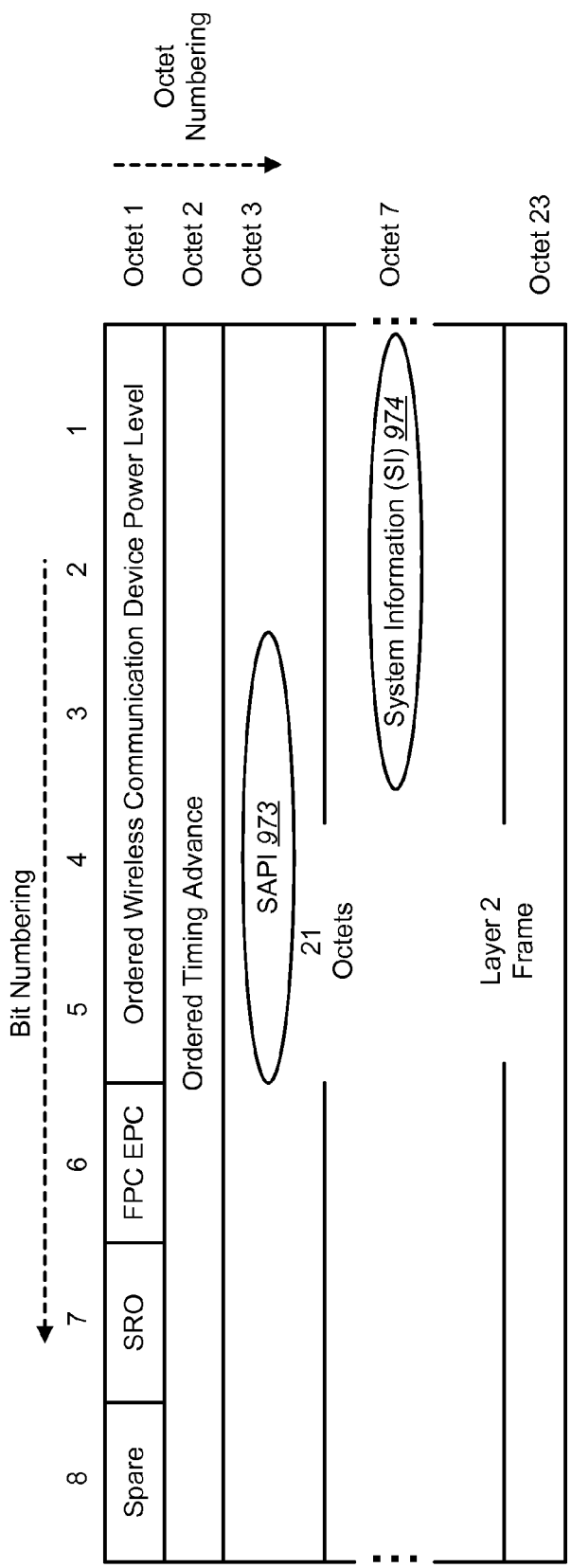
FIG. 9 is a block diagram illustrating the slow associated control channel (SACCH) block format according to some embodiments.

FIG. 9 is a block diagram illustrating the slow associated control channel (SACCH) block format. A slow associated control channel (SACCH) block 112 may include 23 octets. Each octet may include 8 bits.

Service access point identifier (SAPI) information 973 is included in the third, fourth, and fifth bits of the third octet. The third octet of the slow associated control channel (SACCH) block is a data link layer (L2) 350 header. The service access point identifier (SAPI) information 973 may indicate whether the information included in the slow associated control channel (SACCH) block 112 is system information (SI) or message information (MI), both of which have a service access point identifier (SAPI) 973 value of 0. Additionally, the service access point identifier (SAPI) information 973 may indicate whether the information included in the slow associated control channel (SACCH) block 112 is short message service (SMS) information, which has a service access point identifier (SAPI) value of 3.

System information (SI) 974 may be identified by the first three bits of the seventh octet. For example, the system information may be System Information Type 5 (SI5), System Information Type 5bis (SI5bis), System Information Type 5ter (SI5ter), and System Information Type 6 (SI6).

System Information Type 5 (SI5) message content is listed in Table 1.

TABLE 1

| Information Element | Type/Reference | Presence | Format | Length |
|---|---|---|---|---|
| L2 pseudo length | L2 pseudo length 10.5.2.19 | M | V | 1 |
| RR Management Protocol Discriminator | Protocol Discriminator 10.2 | M | V | ½ |
| Skip Indicator | Skip Indicator 10.3.1 | M | V | ½ |
| System Information Type 5 Message Type | Message Type 10.4 | M | V | 1 |
| BCCH Frequency List | Neighbor Cell Description 10.5.2.22 | M | V | 16 |

System Information Type 5bis (SI5bis) message content is listed in Table 2.

TABLE 2

| Information Element | Type/Reference | Presence | Format | Length |
|---|---|---|---|---|
| L2 pseudo length | L2 pseudo length 10.5.2.19 | M | V | 1 |
| RR Management Protocol Discriminator | Protocol Discriminator 10.2 | M | V | ½ |
| Skip Indicator | Skip Indicator 10.3.1 | M | V | ½ |
| System Information Type 5bis Message Type | Message Type 10.4 | M | V | 1 |
| Extension of the BCCH Frequency List | Neighbor Cell Description 10.5.2.22 | M | V | 16 |

System Information Type 5ter (SI5ter) message content is listed in Table 3.

TABLE 3

| Information Element | Type/Reference | Presence | Format | Length |
|---|---|---|---|---|
| L2 pseudo length | L2 pseudo length 10.5.2.19 | M | V | 1 |
| RR Management Protocol Discriminator | Protocol Discriminator 10.2 | M | V | ½ |
| Skip Indicator | Skip Indicator 10.3.1 | M | V | ½ |

TABLE 3-continued

| Information Element | Type/Reference | Presence | Format | Length |
| --- | --- | --- | --- | --- |
| System Information Type 5ter Message Type | Message Type 10.4 | M | V | 1 |
| Extended BCCH Frequency List | Neighbor Cell Description 10.5.2.22a | M | V | 16 |

System Information Type 6 (SI6) message content is listed in Table 4.

TABLE 4

| Information Element | Type/Reference | Presence | Format | Length |
| --- | --- | --- | --- | --- |
| L2 pseudo length | L2 pseudo length 10.5.2.19 | M | V | 1 |
| RR Management Protocol Discriminator | Protocol Discriminator 10.2 | M | V | ½ |
| Skip Indicator | Skip Indicator 10.3.1 | M | V | ½ |
| System Information Type 6 Message Type | Message Type 10.4 | M | V | 1 |
| Cell Identity | Cell Identity 10.5.1.1 | M | V | 2 |
| Location Area Identification | Location Area Identification 10.5.1.3 | M | V | 5 |
| Cell Options | Cell Options (SACCH) 10.5.2.3 | M | V | 1 |
| NCC Permitted | NCC Permitted 10.5.2.27 | M | V | 1 |
| SI6 Rest Octets | SI6 Rest Octets 10.5.2.35a | M | V | 7 |

Figure 10:
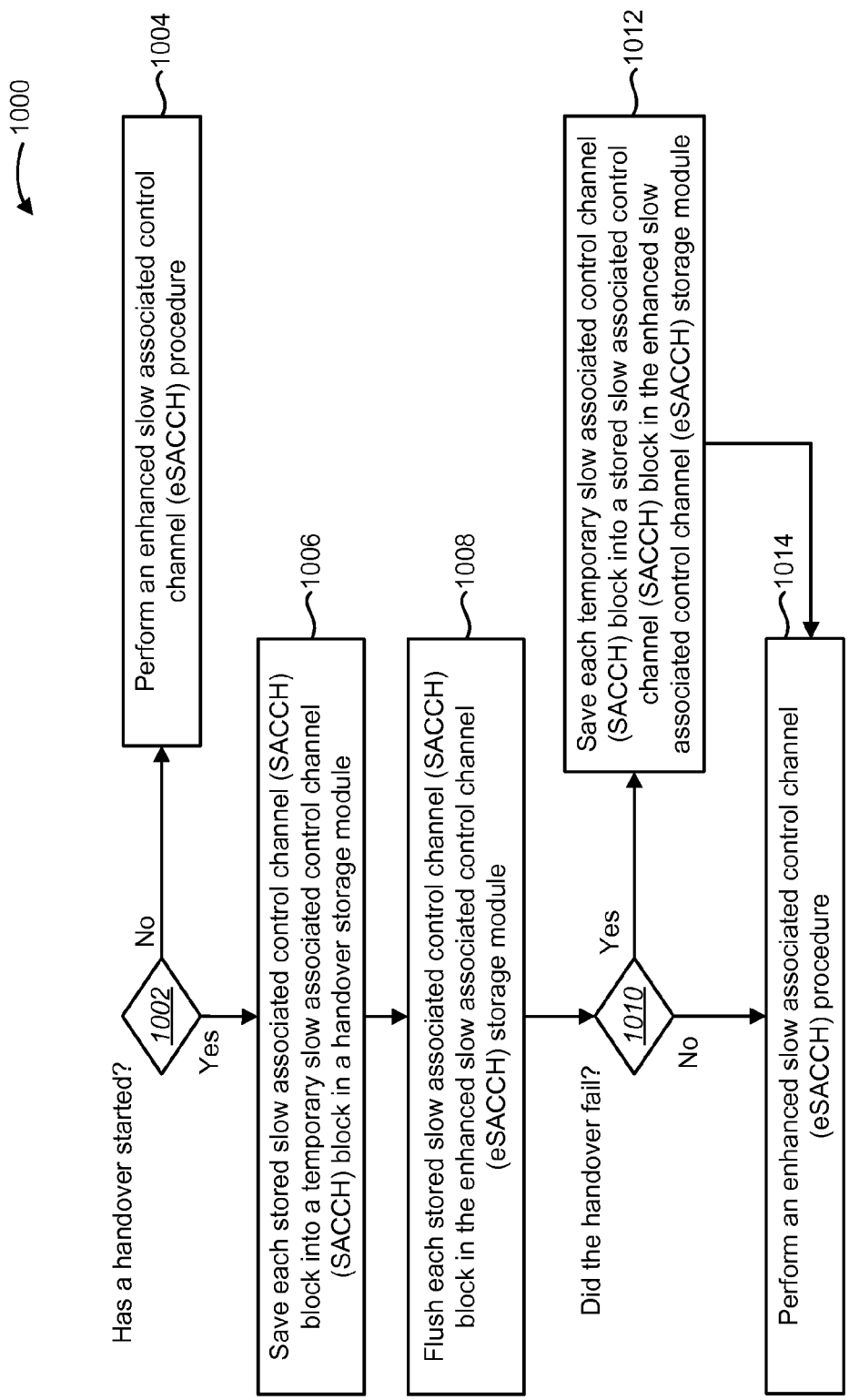
FIG. 10 is a flow diagram of a method for performing an enhanced slow associated control channel (eSACCH) procedure during a base station handover according to some embodiments.

FIG. 10 is a flow diagram of a method 1000 for performing an enhanced slow associated control channel (eSACCH) procedure during a handover. A handover refers to the process of transferring an ongoing call or data session from one channel connected to the core network 228 to another. A handover may alternatively be referred to as a handoff.

A handover may occur for a variety of reasons. In one case, a handover may occur when a wireless communication device 504 (i.e., the receiving wireless device 104) connection is transferred from a source base station 502 to a destination base station 502. This case may be referred to as an inter-cell handover. In this case, the wireless communication device 504 may start a handover when the connection between the wireless communication device 504 and a source base station 502 is transferred to a destination base station 502. This inter-cell handover may occur, for example, when the wireless communication device 504 moves away from the area covered by the source base station 502 to the area covered by the destination base station 502. An inter-cell handover may also occur when the capacity for connecting new calls to the source base station 502 is used up. A new connection from the wireless communication device 504 is transferred to a destination base station 502 to free up capacity for the source base station 502.

A handover may also occur when the wireless communication device 504 switches channels on one base station 502. This case may be referred to as an intra-cell handover. In this case, a first channel may be interfered or degraded. The wireless communication device 504 may change to a second channel that is clearer.

The wireless communication device 504 may determine 1002 whether a handover has started. For example, the wireless communication device 504 may evaluate a handover flag (e.g., HO_CMD). The wireless communication device 504 may determine 1002 whether a handover has started if the handover flag is true (e.g., HO_CMD==true). In an inter-cell handover scenario, the wireless communication device 504 may receive the handover flag from the source base station 502 before the connection is transferred to the destination base station 502. In an intra-cell handover scenario, the wireless communication device 504 may remain connected to the source base station 502, but the wireless communication device 504 may receive the handover flag from the source base station 502 indicating a change from a first channel to a second channel.

If the wireless communication device 504 determines 1002 that the handover has not started (e.g., HO_CMD==false), then the wireless communication device 504 remains connected with the source base station 502. In this case, the wireless communication device 504 may perform 1004 the enhanced slow associated control channel (eSACCH) procedure as described above in connection with FIG. 4 and FIG. 7.

If the wireless communication device 504 determines 1002 that the handover has started (e.g., HO_CMD==true), then the wireless communication device 504 may save 1006 each stored slow associated control channel (SACCH) block 122a-e into a temporary slow associated control channel (SACCH) block 124a-e in a handover storage module 116. In the inter-cell handover scenario, the wireless communication device 504 may save the stored slow associated control channel (SACCH) blocks 122a-e into the temporary slow associated control channel (SACCH) blocks 124a-e in the event that the handover fails. For example, in an inter-cell handover, the wireless communication device 504 may fail to connect to the destination base station 502. In an intra-cell handover, the wireless communication device 504 may fail to transfer from the first channel to the second channel. Therefore, the wireless communication device 504 may use the temporary slow associated control channel (SACCH) blocks 124a-e to reconnect with the source base station 502 in the event that the handover fails.

The wireless communication device 504 may flush 1008 each stored slow associated control channel (SACCH) block 122a-e in the enhanced slow associated control channel (eSACCH) storage module 125. For example, the wireless communication device 504 may set each stored slow associated control channel (SACCH) block 122a-e to zero. The wireless communication device 504 may flush 1008 each stored slow associated control channel (SACCH) block 122a-e to ensure that the correlation levels for a slow associated control channel (SACCH) block 112 received from the destination base station 502 are based only on a slow associated control channel (SACCH) block 112 sent by the destination base station 502 and not the source base station 502.

The wireless communication device 504 may determine 1010 whether the handover failed. In one configuration, the wireless communication device 504 may determine 1010 whether the handover failed by evaluating a handover failure flag (e.g., HO_FAIL).

If the wireless communication device 504 determines 1010 that the handover failed (e.g., HO_FAIL==true), the wireless communication device 504 may save 1012 each temporary slow associated control channel (SACCH) block 124a-e into a stored slow associated control channel (SACCH) block 122 in the enhanced slow associated control channel (eSACCH) storage module 125. In other words, if the handover to the destination base station 502 fails, the wireless communication device 504 may restore the previous system information (SI) and message information (MI) to reconnect with the source base station 502. Upon restoring the stored slow associated control channel (SACCH) blocks 122a-e, the wireless communication device 504 may perform 1014 an enhanced slow associated control channel (eSACCH) procedure with the source base station 502 as described above in connection with FIG. 4 and FIG. 7.

If the wireless communication device 504 determines 1010 that the handover to the second base station 502 did not fail (e.g., HO_FAIL==false), the wireless communication device 504 may perform 1014 an enhanced slow associated control channel (eSACCH) procedure with the destination base station 502. In this case, the stored slow associated control channel (SACCH) blocks 122a-e were flushed (e.g., by setting the stored slow associated control channel (SACCH) blocks 122a-e to zero), and the wireless communication device 504 may begin saving the slow associated control channel (SACCH) block 112 received from the destination base station 502 to the stored slow associated control channel (SACCH) blocks 122a-e.

Figure 11:
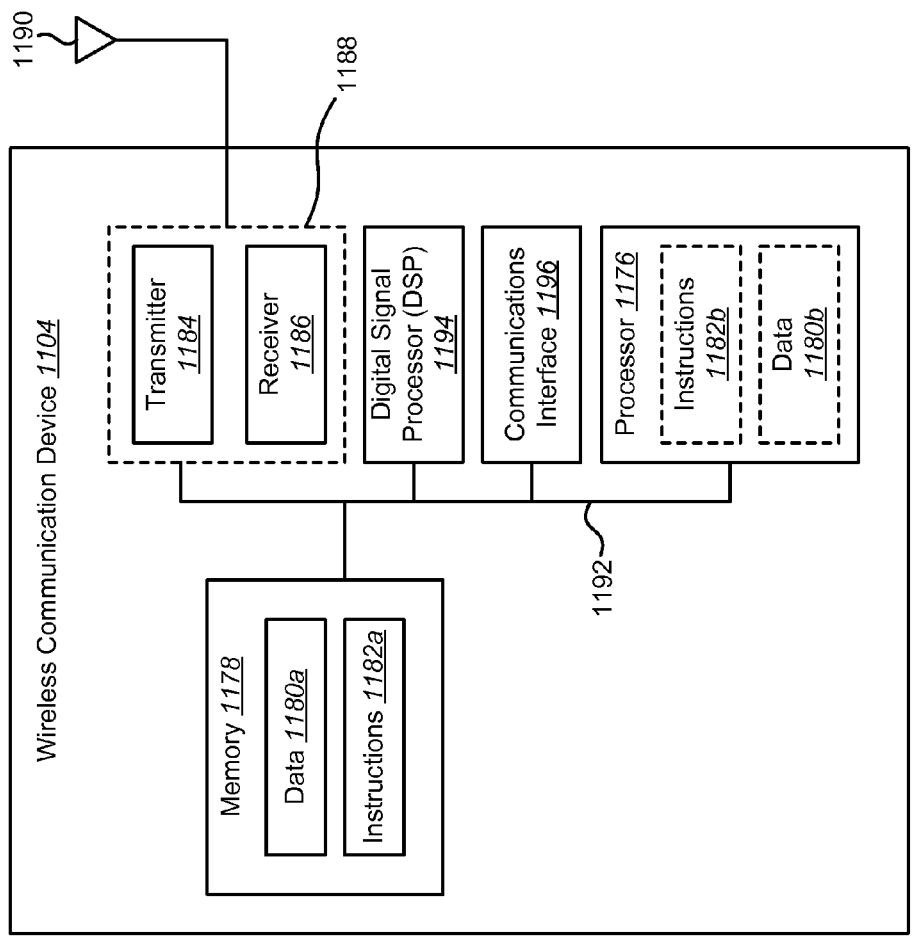
FIG. 11 illustrates certain components that may be included within a wireless communication device according to some embodiments.

FIG. 11 illustrates certain components that may be included within a wireless communication device 1104. The wireless communication device 1104 may be an access terminal, a mobile station, a user equipment (UE), etc. The wireless communication device 1104 includes a processor 1176. The processor 1176 may be a general purpose single- or multi-chip microprocessor (e.g., an ARM), a special purpose microprocessor (e.g., a digital signal processor (DSP)), a microcontroller, a programmable gate array, etc. The processor 1176 may be referred to as a central processing unit (CPU). Although just a single processor 1176 is shown in the wireless communication device 1104 of FIG. 11, in an alternative configuration, a combination of processors (e.g., an ARM and DSP) could be used.

The wireless communication device 1104 also includes memory 1178. The memory 1178 may be any electronic component capable of storing electronic information. The memory 1178 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1180a and instructions 1182a may be stored in the memory 1178. The instructions 1182a may be executable by the processor 1176 to implement the methods disclosed herein. Executing the instructions 1182a may involve the use of the data 1180a that is stored in the memory 1178. When the processor 1176 executes the instructions 1182, various portions of the instructions 1182b may be loaded onto the processor 1176, and various pieces of data 1180b may be loaded onto the processor 1176.

The wireless communication device 1104 may also include a transmitter 1184 and a receiver 1186 to allow transmission and reception of signals to and from the wireless communication device 1104 via an antenna 1190. The transmitter 1184 and receiver 1186 may be collectively referred to as a transceiver 1188. The wireless communication device 1104 may also include (not shown) multiple transmitters, additional antennas, multiple receivers and/or multiple transceivers.

The wireless communication device 1104 may include a digital signal processor (DSP) 1194. The wireless communication device 1104 may also include a communications interface 1196. The communications interface 1196 may allow a user to interact with the wireless communication device 1104.

The various components of the wireless communication device 1104 may be coupled together by one or more buses, which may include a power bus, a control signal bus, a status signal bus, a data bus, etc. For the sake of clarity, the various buses are illustrated in FIG. 11 as a bus system 1192.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 4, FIG. 7 and FIG. 10, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

We claim:

1. A method for wireless communication, the method comprising:
   receiving a slow associated control channel (SACCH) block comprising multiple bursts;
   determining that the slow associated control channel block fails an integrity check;
   determining a correlation level between one of the bursts in the slow associated control channel block and a portion of each of multiple stored slow associated control channel blocks; and
   setting the stored slow associated control channel blocks based on a maximum correlation level, wherein setting the stored slow associated control channel blocks based on the maximum correlation level comprises notifying a transmitting device that the SACCH block was not successfully received if the maximum correlation level is below a threshold.

2. The method of claim 1, wherein the integrity check is a cyclic redundancy check.

3. The method of claim 1, wherein the stored slow associated control channel blocks previously passed a cyclic redundancy check.

4. The method of claim 1, wherein the method is performed by a wireless communication device.

5. The method of claim 1, wherein the method is performed by a base station.

6. The method of claim 1, wherein setting the stored slow associated control channel blocks based on the maximum correlation level comprises reusing the stored slow associated control channel blocks if the maximum correlation level is above the threshold.

7. The method of claim 1, wherein determining the correlation level comprises selecting a burst with a highest quality in the slow associated control channel block.

8. The method of claim 7, wherein the burst with the highest quality has a highest estimated signal-to-noise ratio.

9. The method of claim 7, wherein the portion of the stored slow associated control channel block is of a same type as the burst.

10. The method of claim 9, wherein it is determined that the portion of the stored slow associated control channel block comprises one of system information and measurement information.

11. The method of claim 1, further comprising:
   starting a handover;
   saving the stored slow associated control channel blocks into temporary slow associated control channel blocks; and
   flushing the stored slow associated control channel blocks.

12. The method of claim 11, further comprising saving the temporary slow associated control channel blocks into the stored slow associated control channel blocks upon a handover failure.

13. The method of claim 1, further comprising reusing a current power control level and a current timing advance, wherein the current power control level and the current timing advance are based on a previously received slow associated control channel block that passed a cyclic redundancy check.

14. An apparatus for wireless communication, comprising:
   a processor;
   memory in electronic communication with the processor; and instructions stored in the memory, the instructions being executable by the processor to:
- receive a slow associated control channel (SACCH) block comprising multiple bursts;
- determine that the slow associated control channel block fails an integrity check;
- determine a correlation level between one of the bursts in the slow associated control channel block and a portion of each of multiple stored slow associated control channel blocks; and
- set the stored slow associated control channel blocks based on a maximum correlation level, wherein setting the stored slow associated control channel blocks based on the maximum correlation level comprises notifying a transmitting device that the SACCH block was not successfully received if the maximum correlation level is below a threshold.

15. The apparatus of claim 14, wherein the integrity check is a cyclic redundancy check.

16. The apparatus of claim 14, wherein the stored slow associated control channel blocks previously passed a cyclic redundancy check.

17. The apparatus of claim 14, wherein the apparatus is a wireless communication device.

18. The apparatus of claim 14, wherein the apparatus is a base station.

19. The apparatus of claim 14, wherein the instructions executable to set the stored slow associated control channel blocks based on the maximum correlation level comprise instructions executable to reuse the stored slow associated control channel blocks if the maximum correlation level is above the threshold.

20. The apparatus of claim 14, wherein determining the correlation level comprises selecting a burst with a highest quality in the slow associated control channel block.

21. The apparatus of claim 20, wherein the burst with the highest quality has a highest estimated signal-to-noise ratio.

22. The apparatus of claim 20, wherein the portion of the stored slow associated control channel block is of a same type as the burst.

23. The apparatus of claim 22, wherein it is determined that the portion of the stored slow associated control channel block comprises one of system information and measurement information.

24. The apparatus of claim 14, wherein the instructions are further executable to:
- start a handover;
- save the stored slow associated control channel blocks into temporary slow associated control channel blocks; and
- flush the stored slow associated control channel blocks.

25. The apparatus of claim 24, wherein the instructions are further executable to save the temporary slow associated control channel blocks into the stored slow associated control channel blocks upon a handover failure.

26. The apparatus of claim 14, wherein the instructions are further executable to reuse a current power control level and a current timing advance, wherein the current power control level and the current timing advance are based on a previously received slow associated control channel block that passed a cyclic redundancy check.

27. A computer-program product for wireless communications, the computer-program product comprising a non-transitory computer-readable medium having instructions thereon, the instructions comprising:
- code for causing a wireless communication device to receive a slow associated control channel (SACCH) block comprising multiple bursts;
- code for causing the wireless communication device to determine that the slow associated control channel block fails an integrity check;
- code for causing the wireless communication device to determine a correlation level between one of the bursts in the slow associated control channel block and a portion of each of multiple stored slow associated control channel blocks; and
- code for causing the wireless communication device to set the stored slow associated control channel blocks based on a maximum correlation level, wherein setting the stored slow associated control channel blocks based on the maximum correlation level comprises notifying a transmitting device that the SACCH block was not successfully received if the maximum correlation level is below a threshold.

28. The computer-program product of claim 27, wherein the code for causing the wireless communication device to set the stored slow associated control channel blocks based on the maximum correlation level comprises code for causing the wireless communication device to reuse the stored slow associated control channel blocks if the maximum correlation level is above the threshold.

29. The computer-program product comprising the non-transitory computer-readable medium of claim 27, wherein the instructions further comprise:
- code for causing the wireless communication device to start a handover;
- code for causing the wireless communication device to save the stored slow associated control channel blocks into temporary slow associated control channel blocks; and
- code for causing the wireless communication device to flush the stored slow associated control channel blocks.

30. The computer-program product comprising the non-transitory computer-readable medium of claim 29, wherein the instructions further comprise code for causing the wireless communication device to save the temporary slow associated control channel blocks into the stored slow associated control channel blocks upon a handover failure.

* * * * *